Nov. 23, 1965   C. VAN DER LELY ETAL   3,219,127
SOIL CULTIVATING IMPLEMENT
Filed Jan. 30, 1962   23 Sheets-Sheet 1

INVENTORS
CORNELIS VAN DER LELY
ARY VAN DER LELY
BY
Mason, Mason & Albright
Attorneys

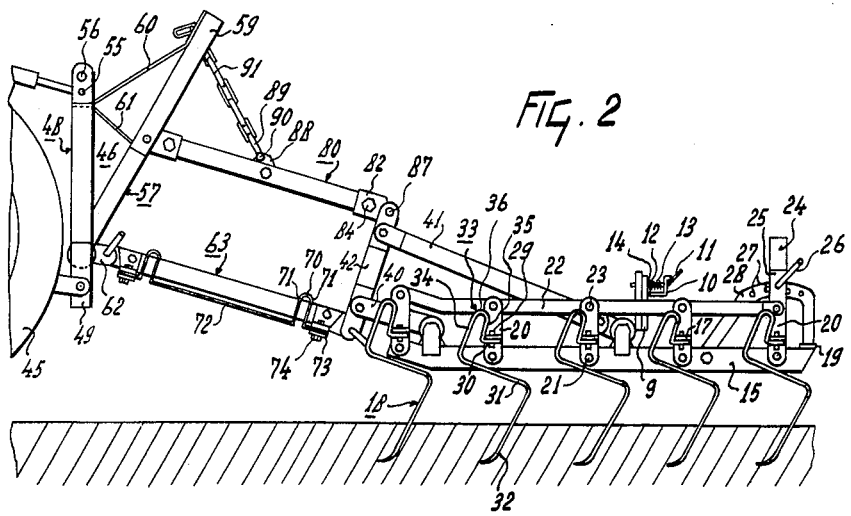
FIG. 2
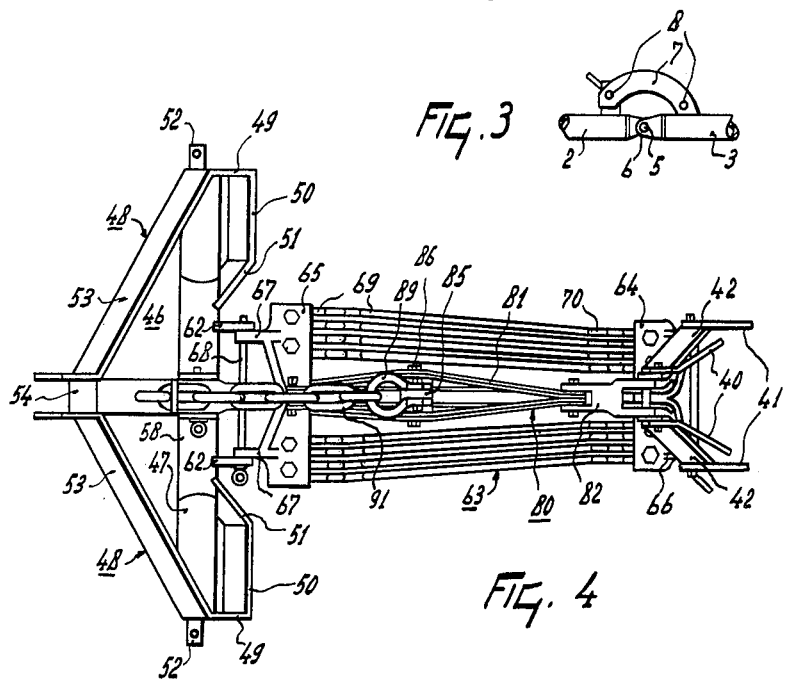
FIG. 3
FIG. 4
INVENTORS
CORNELIS VAN DER LELY
ARY VAN DER LELY
BY
Mason, Mason & Albright
Attorneys

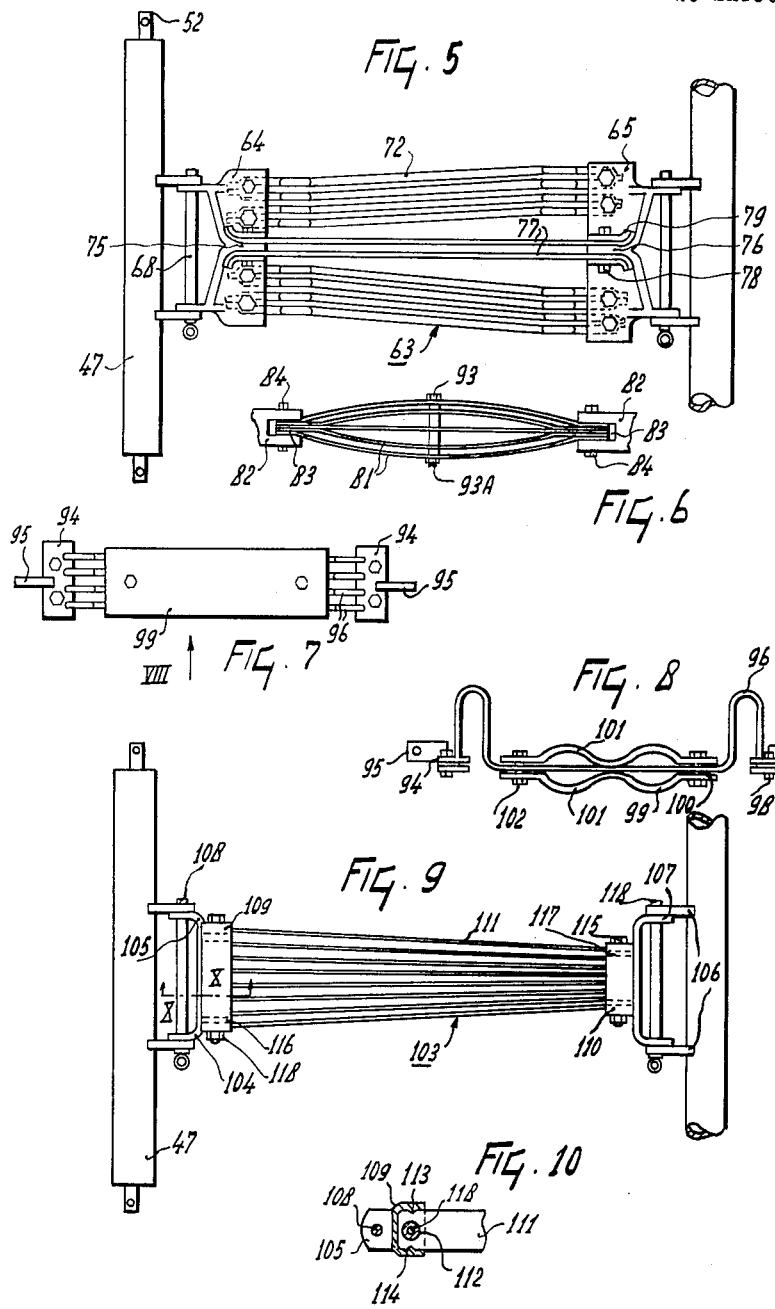

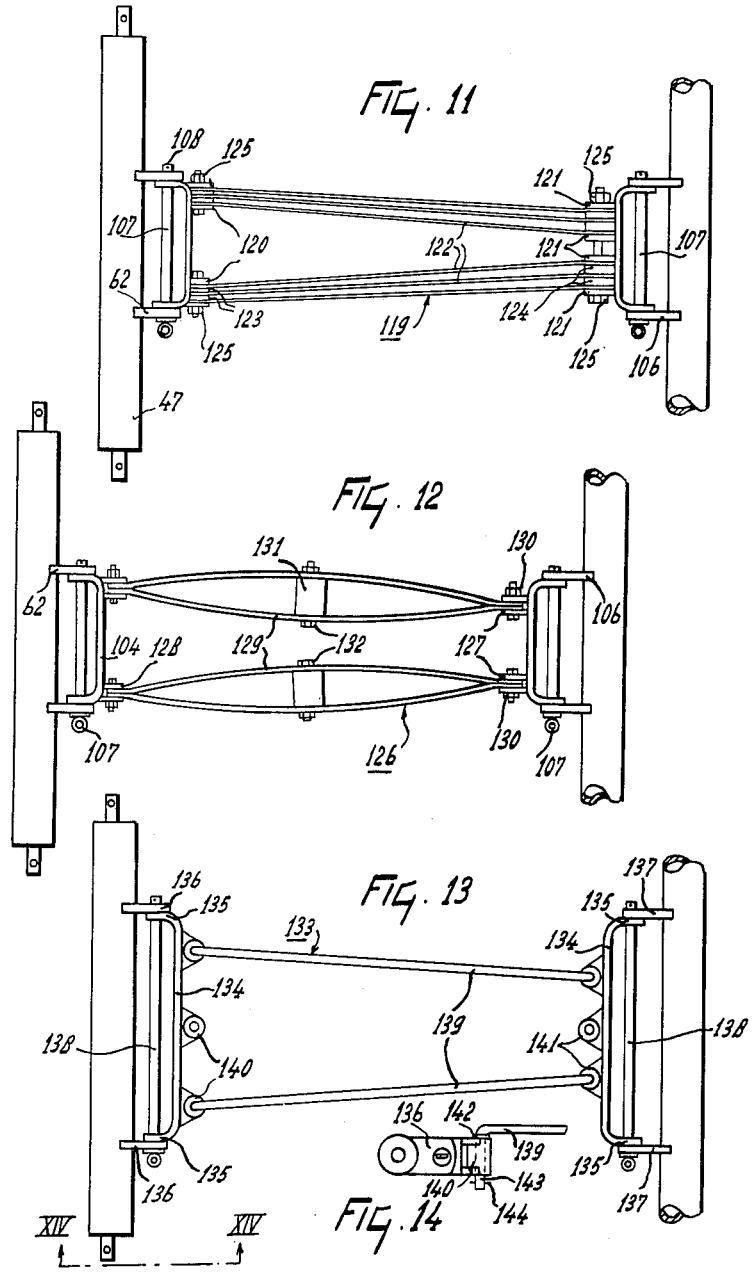

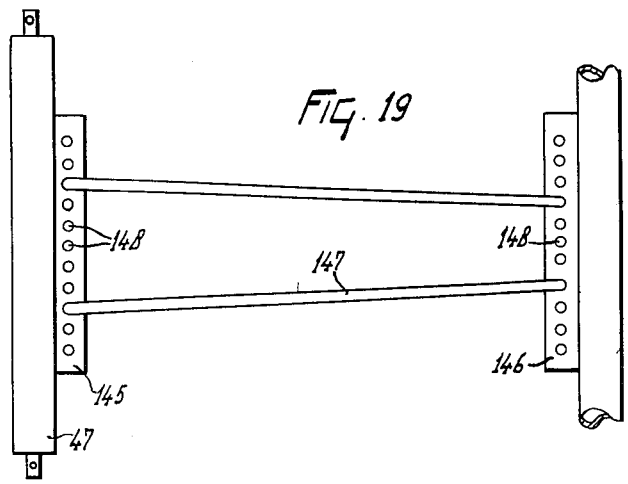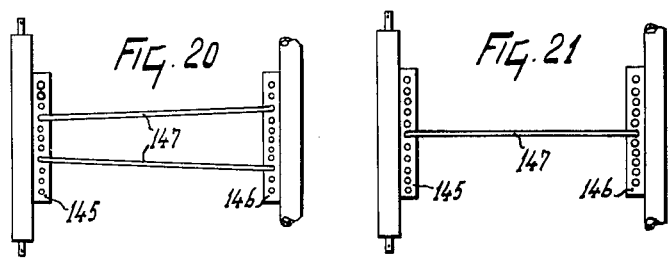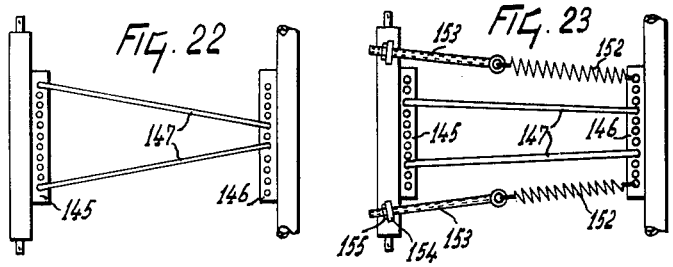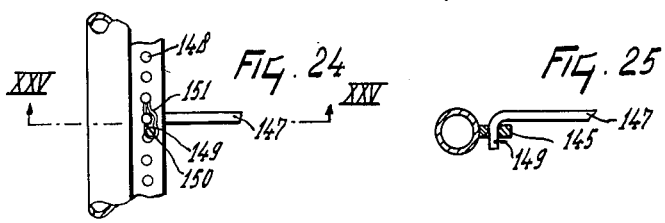

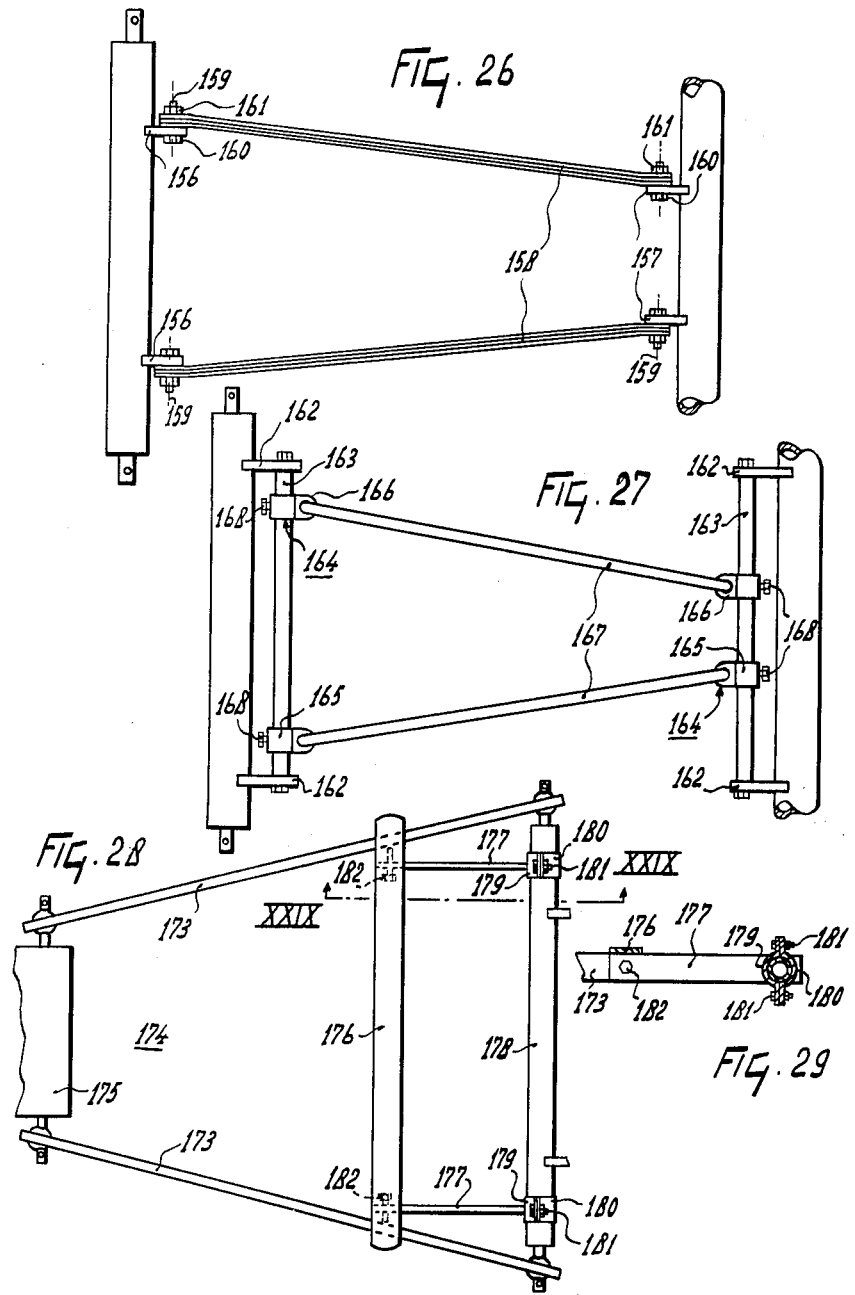

Nov. 23, 1965  C. VAN DER LELY ETAL  3,219,127
SOIL CULTIVATING IMPLEMENT
Filed Jan. 30, 1962  23 Sheets-Sheet 8
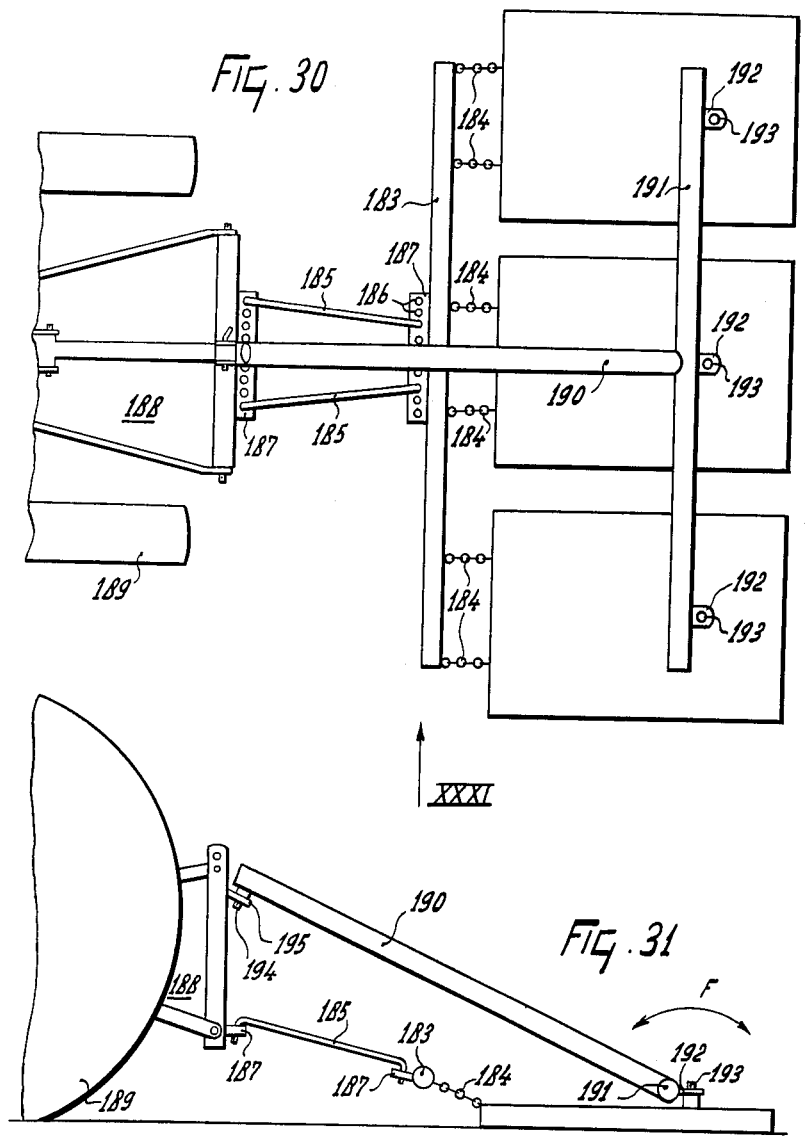
INVENTORS
CORNELIS VAN DER LELY
ARY VAN DER LELY
BY
Mason, Mason & Albright
Attorneys

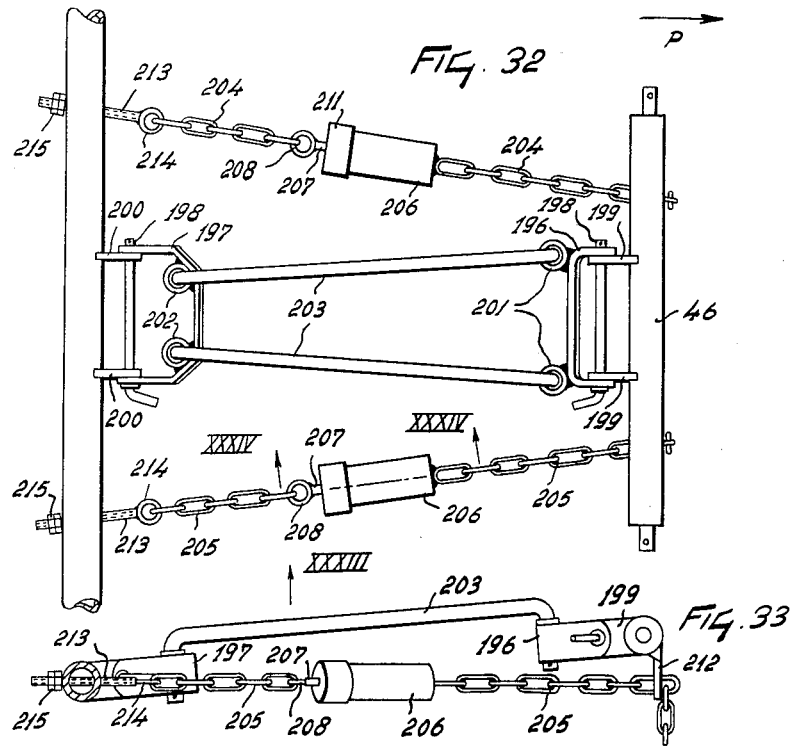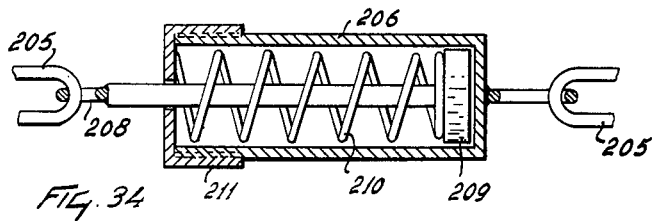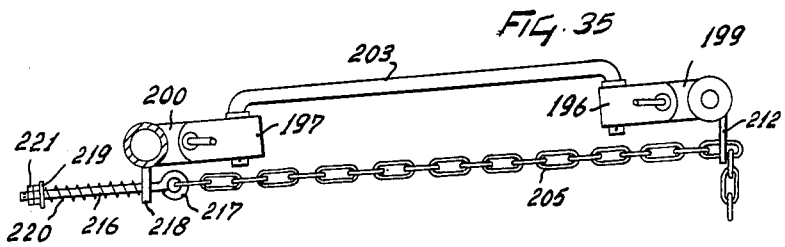

Nov. 23, 1965    C. VAN DER LELY ETAL    3,219,127
SOIL CULTIVATING IMPLEMENT
Filed Jan. 30, 1962    23 Sheets-Sheet 10
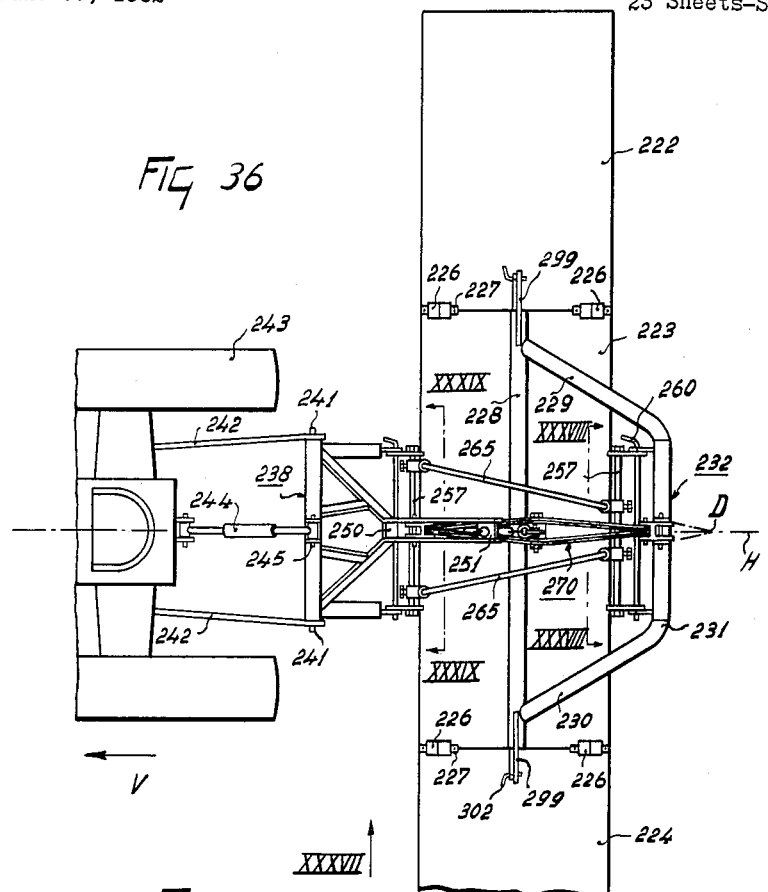
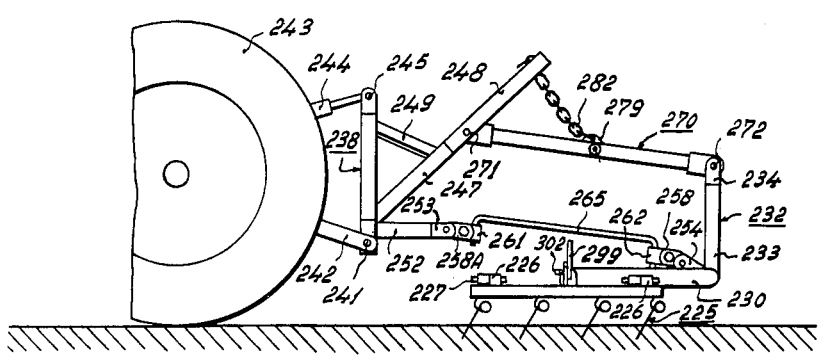
INVENTORS
CORNELIS VAN DER LELY
ARY VAN DER LELY
BY
Mason, Mason & Albright
Attorneys

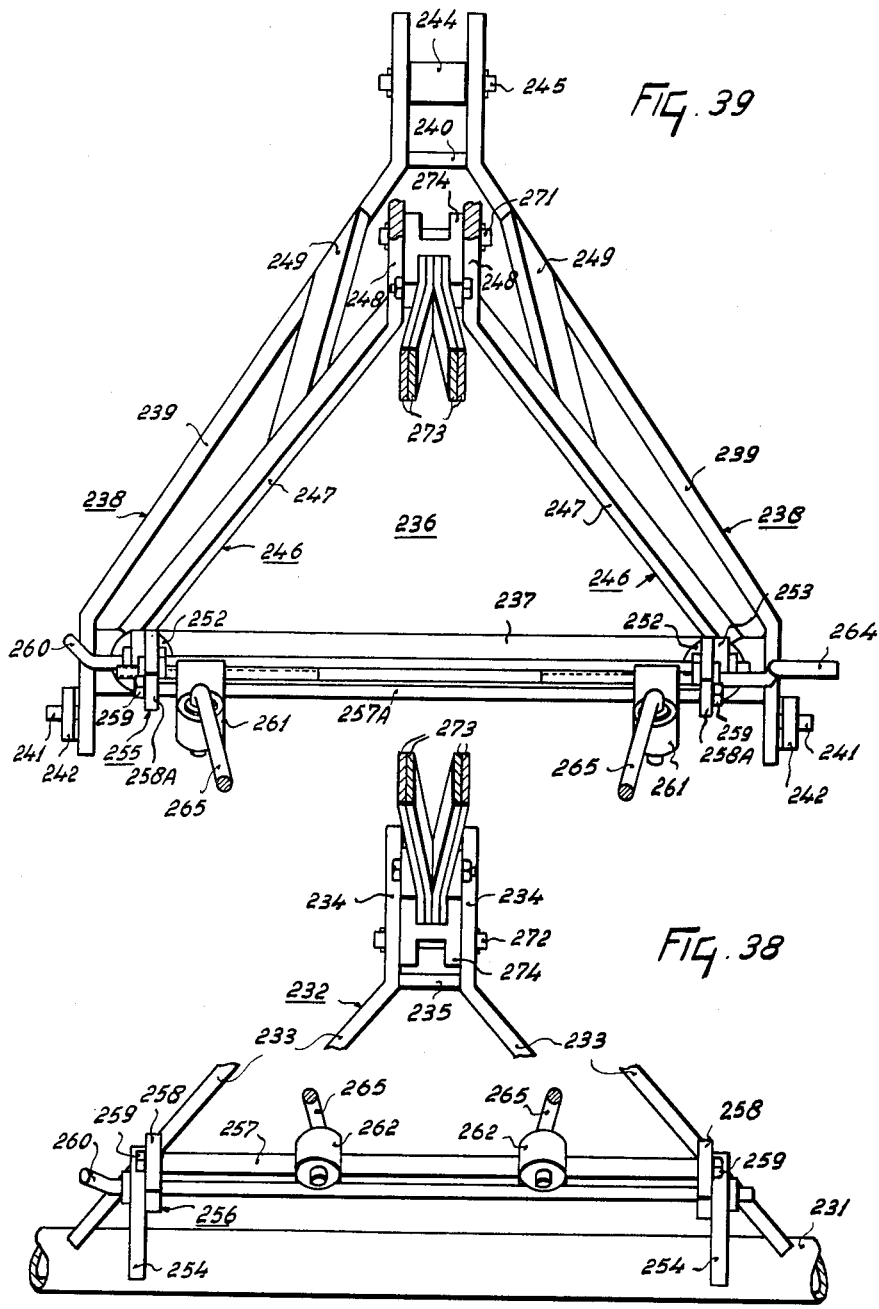

Nov. 23, 1965  C. VAN DER LELY ETAL  3,219,127
SOIL CULTIVATING IMPLEMENT
Filed Jan. 30, 1962  23 Sheets-Sheet 12
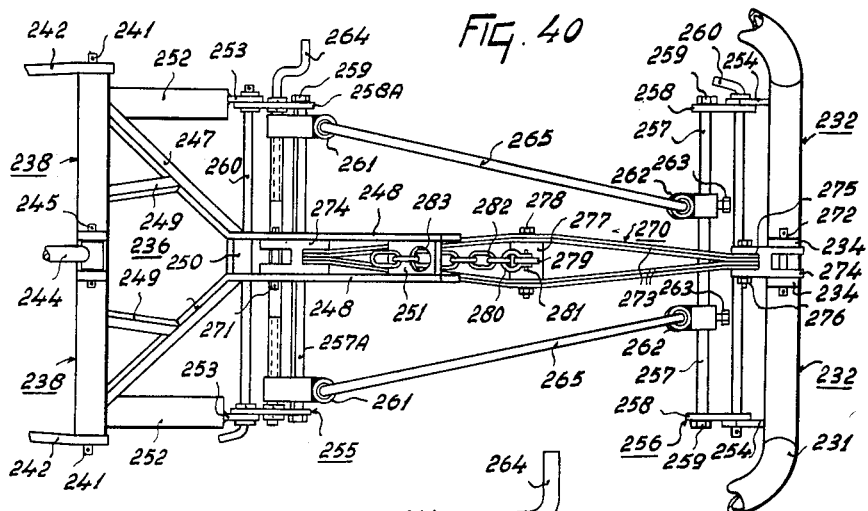
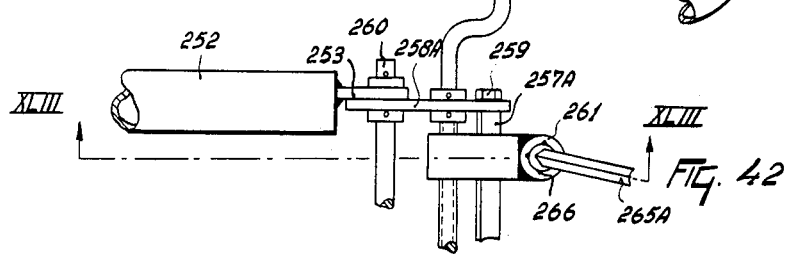
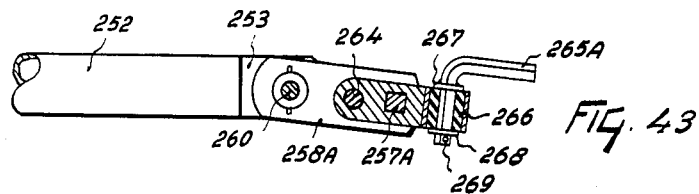
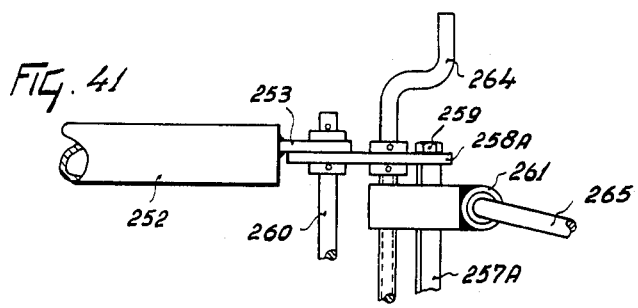
INVENTORS
CORNELIS VAN DER LELY
ARY VAN DER LELY
BY
Mason, Mason & Albright
Attorneys Nov. 23, 1965  C. VAN DER LELY ETAL  3,219,127
SOIL CULTIVATING IMPLEMENT
Filed Jan. 30, 1962  23 Sheets-Sheet 13
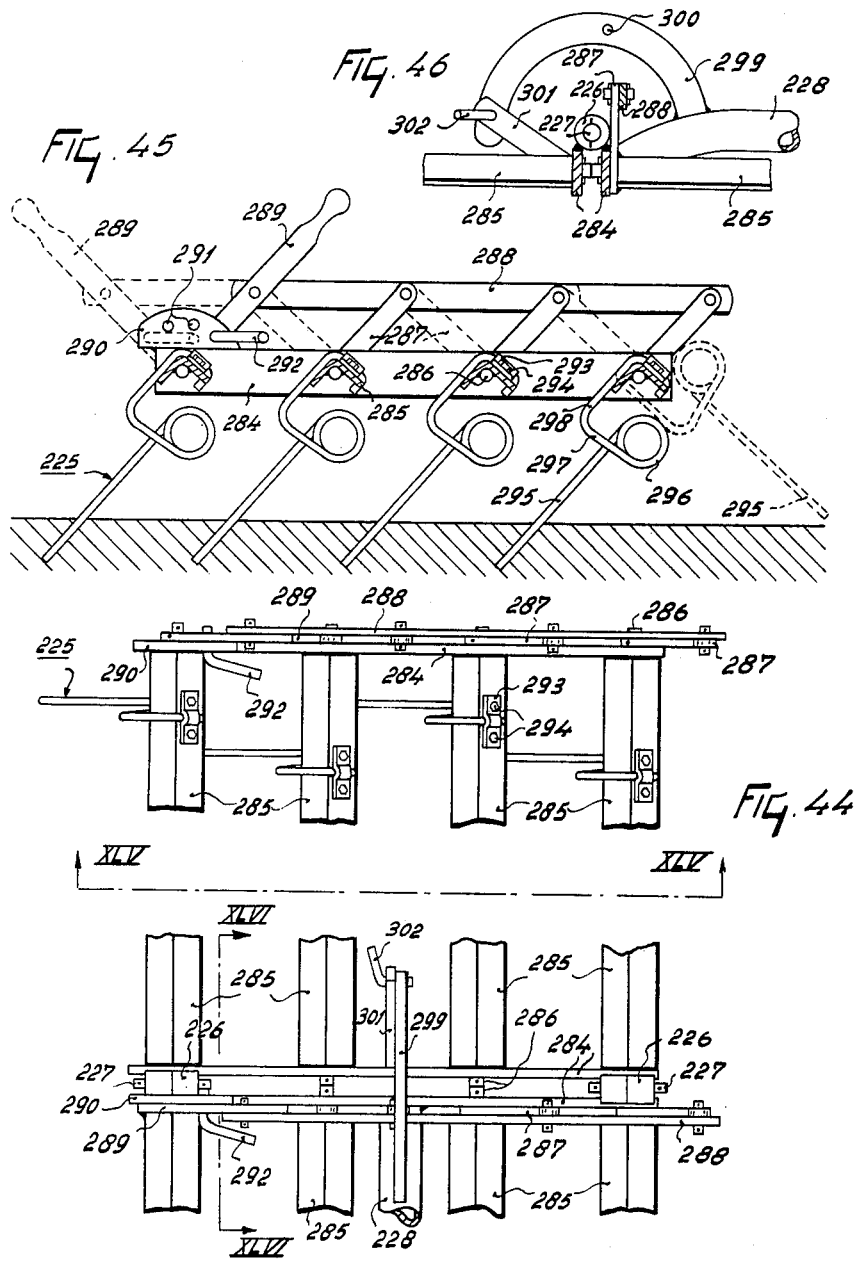
INVENTORS
CORNELIS VAN DER LELY
ARY VAN DER LELY
BY
Mason, Mason & Albright
Attorneys

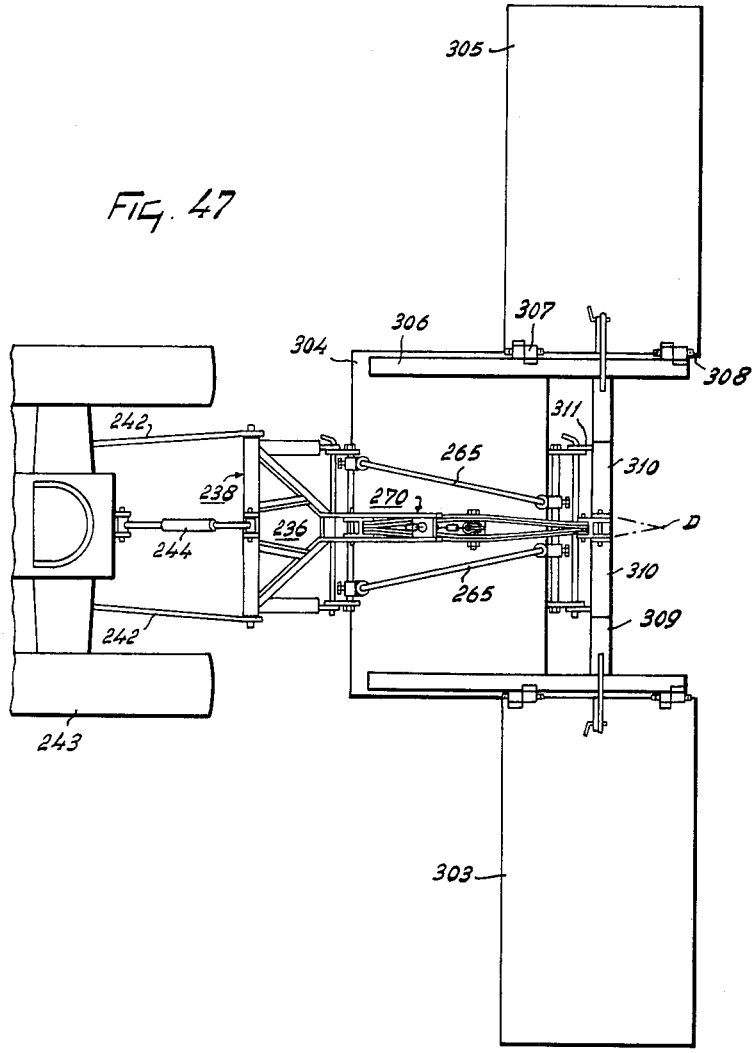

Nov. 23, 1965 C. VAN DER LELY ETAL 3,219,127
SOIL CULTIVATING IMPLEMENT
Filed Jan. 30, 1962 23 Sheets-Sheet 15
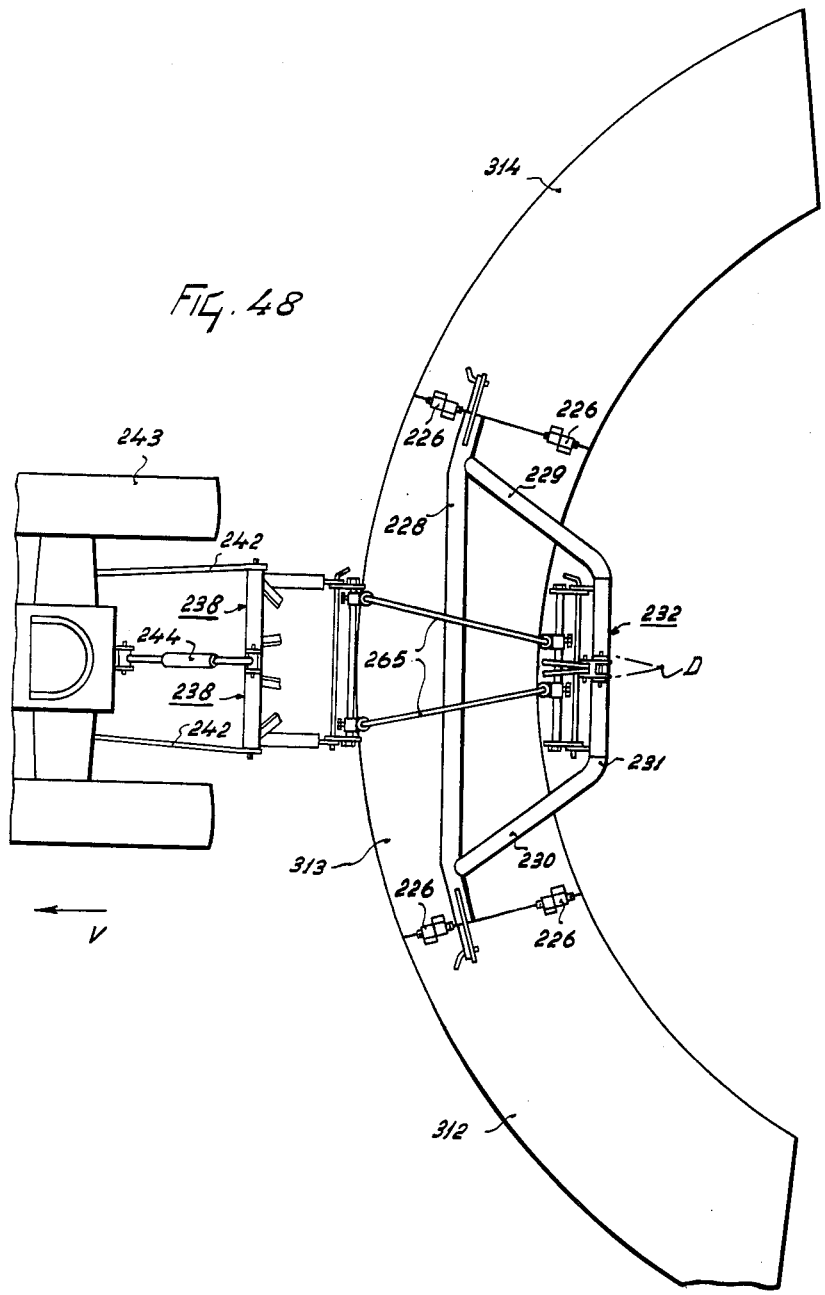
INVENTORS
CORNELIS VAN DER LELY
ARY VAN DER LELY
BY
Mason, Mason & Albright
Attorneys Nov. 23, 1965 C. VAN DER LELY ETAL 3,219,127
SOIL CULTIVATING IMPLEMENT
Filed Jan. 30, 1962 23 Sheets-Sheet 16
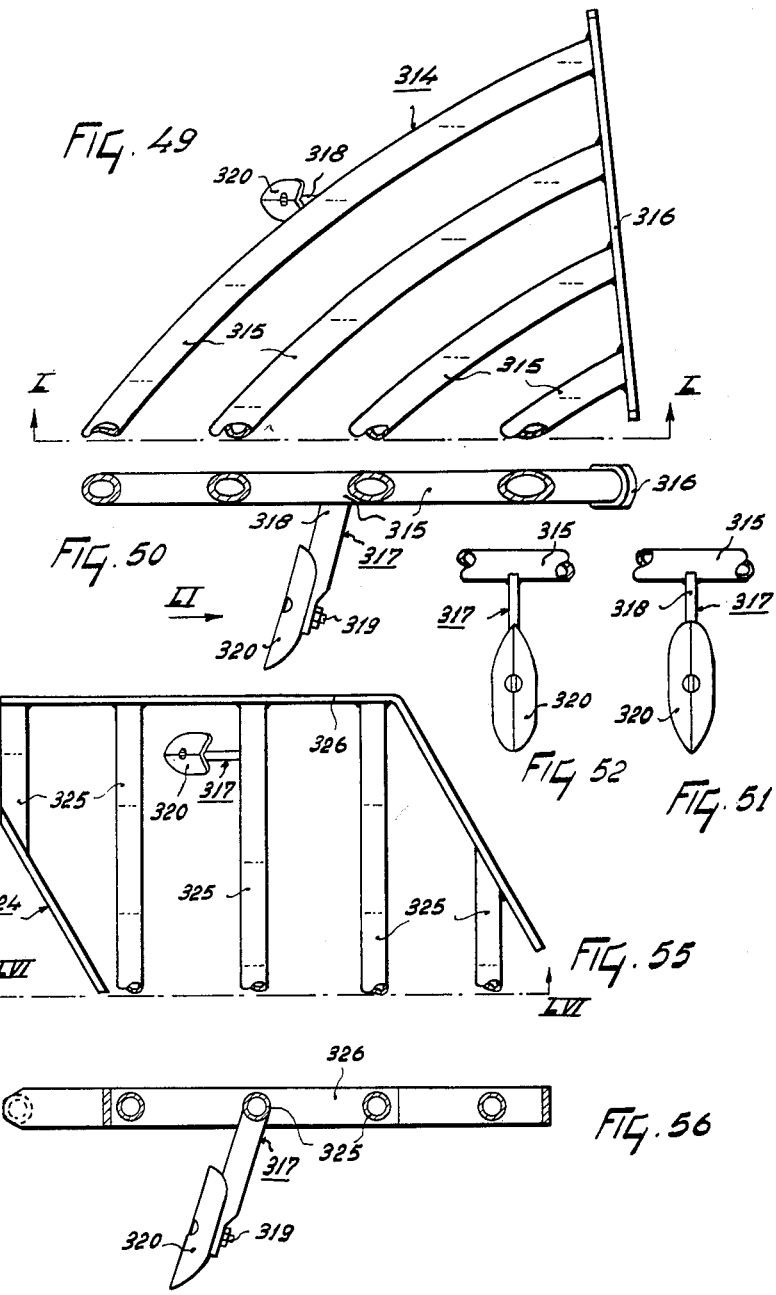
INVENTORS
CORNELIS VAN DER LELY
ARY VAN DER LELY
BY
Mason, Mason & Albright
Attorneys

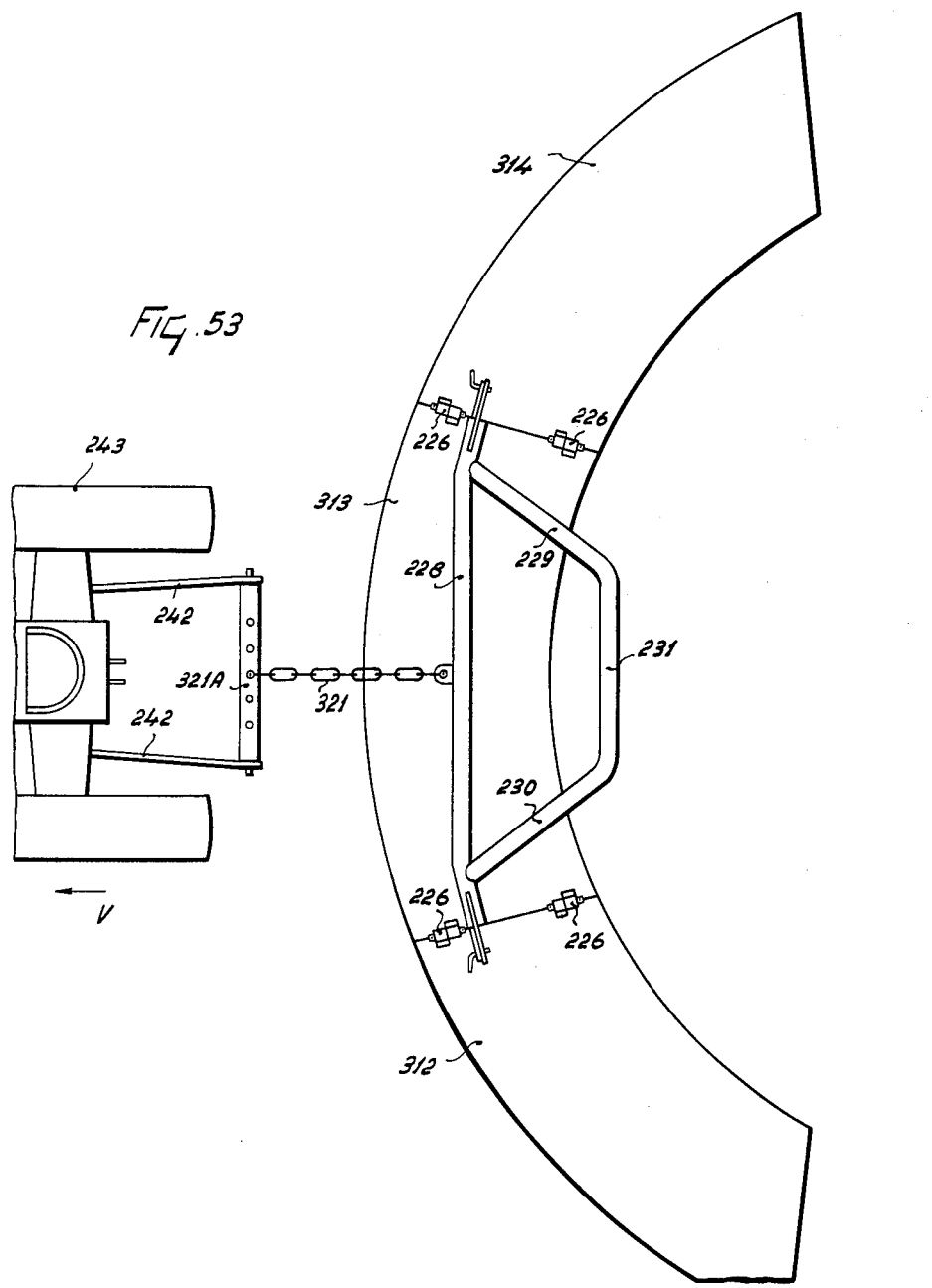

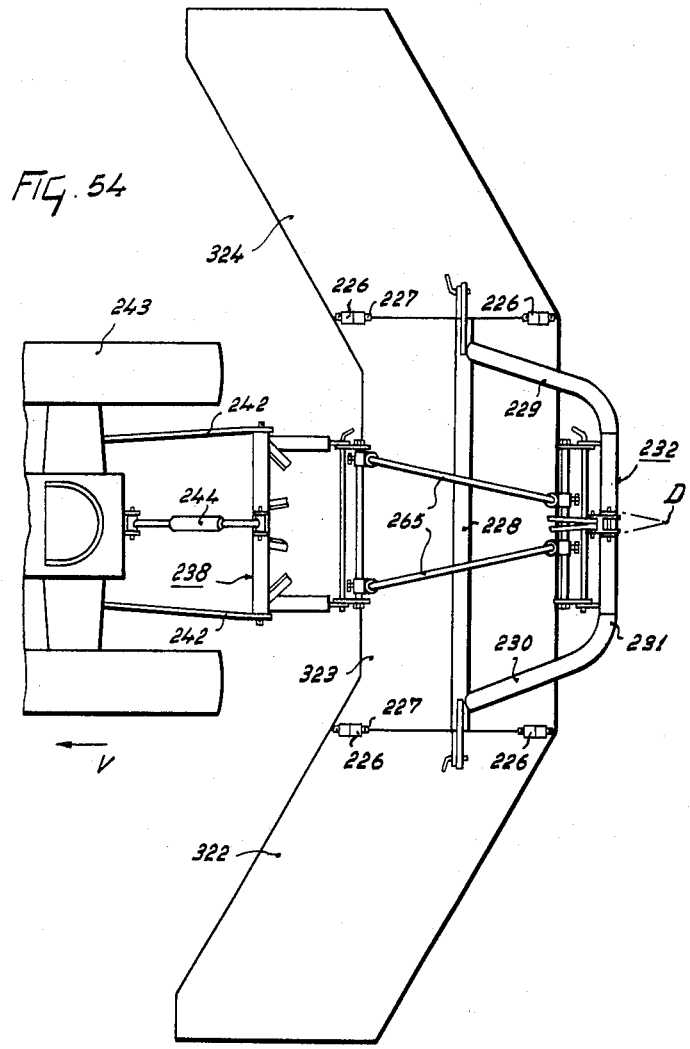

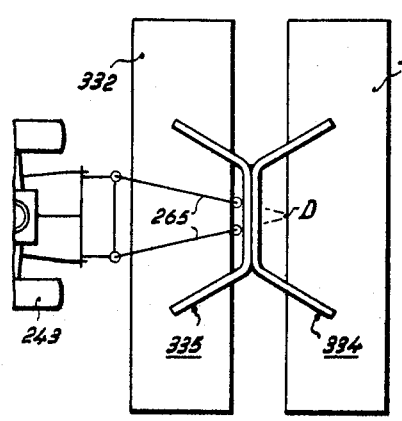
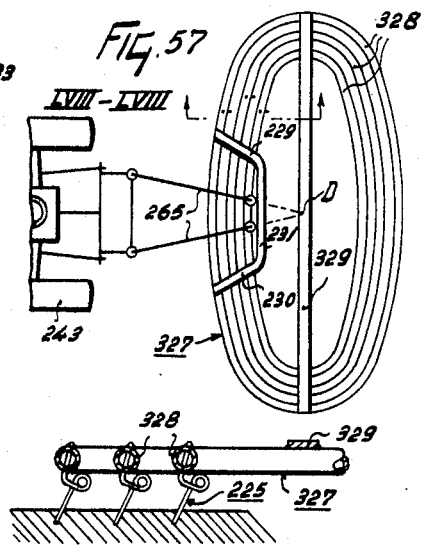
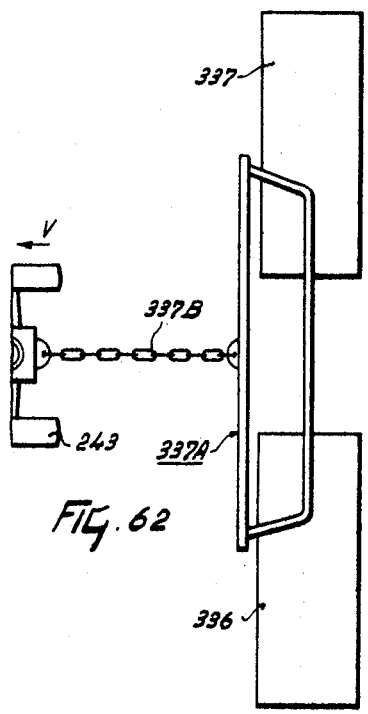
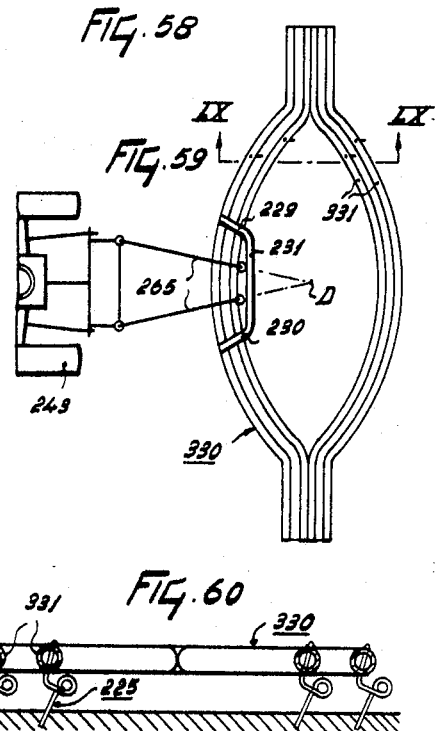
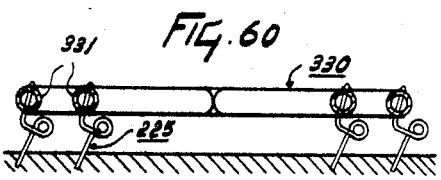

Nov. 23, 1965     C. VAN DER LELY ETAL     3,219,127
SOIL CULTIVATING IMPLEMENT
Filed Jan. 30, 1962     23 Sheets-Sheet 20
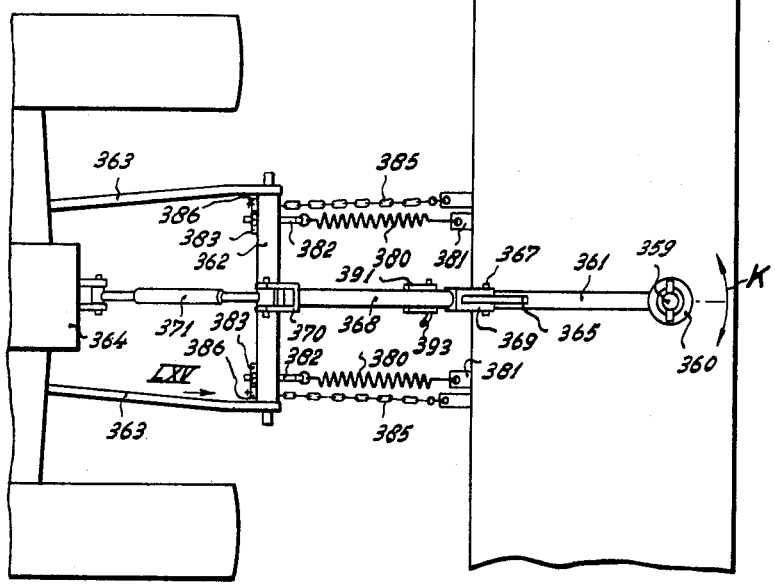
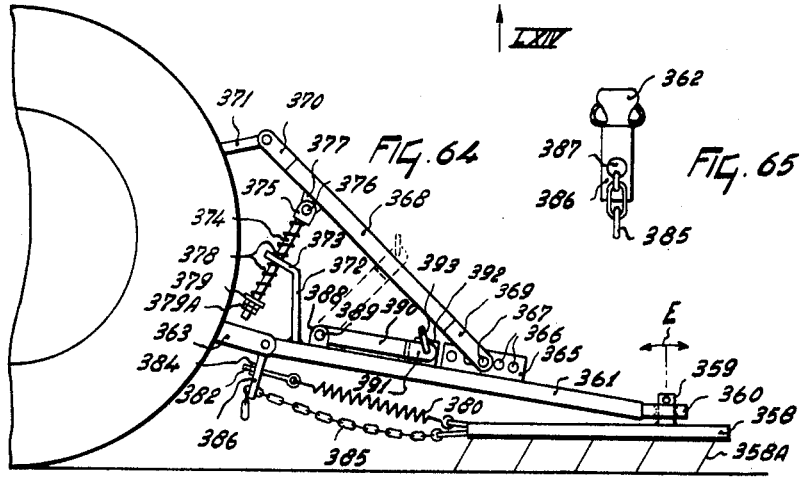
INVENTORS
CORNELIS VAN DER LELY
ARY VAN DER LELY
BY
Mason, Mason & Albright
Attorneys

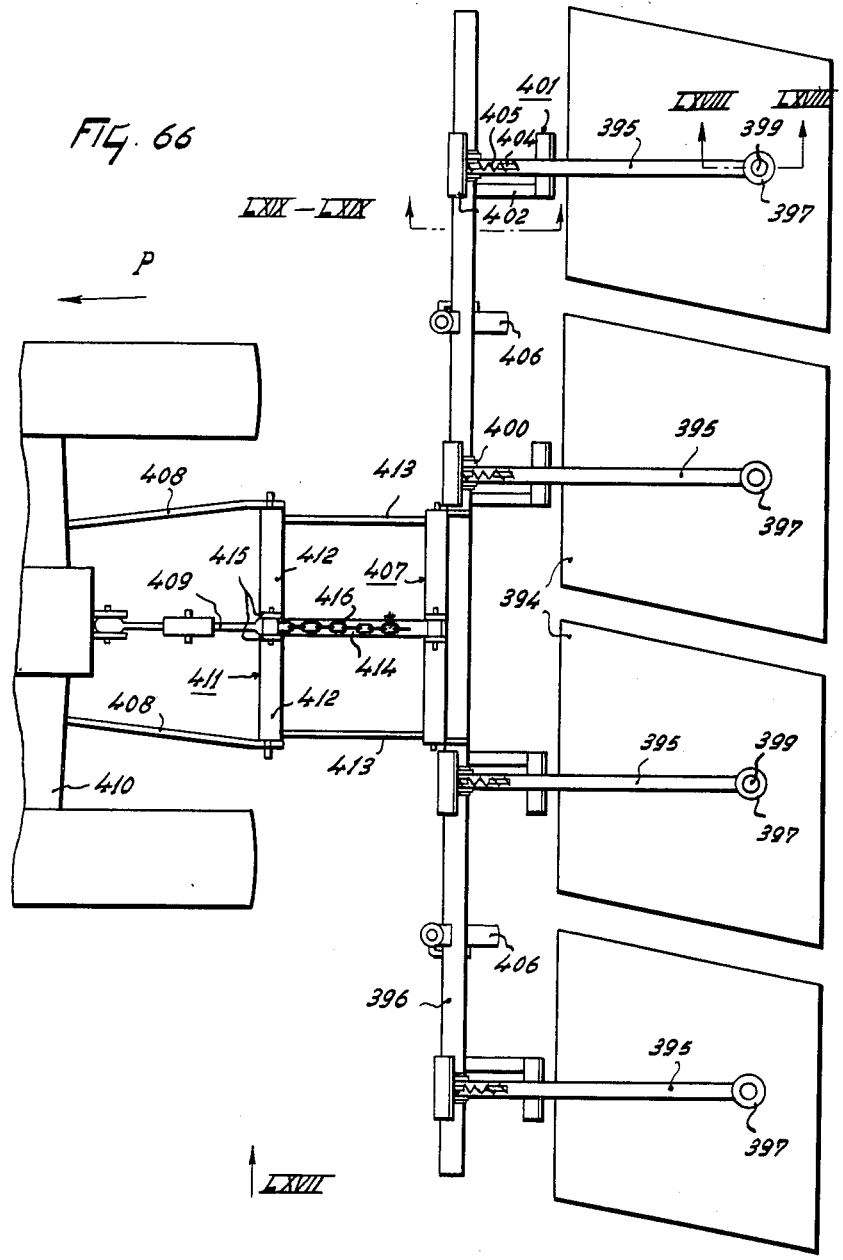

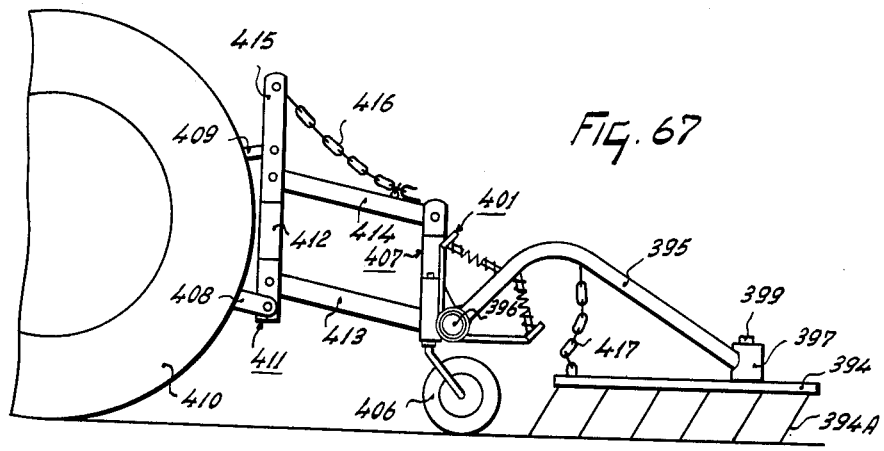
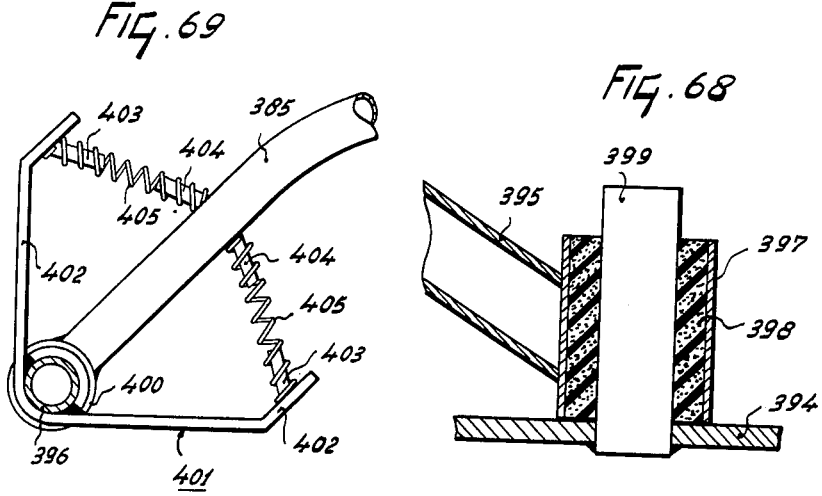

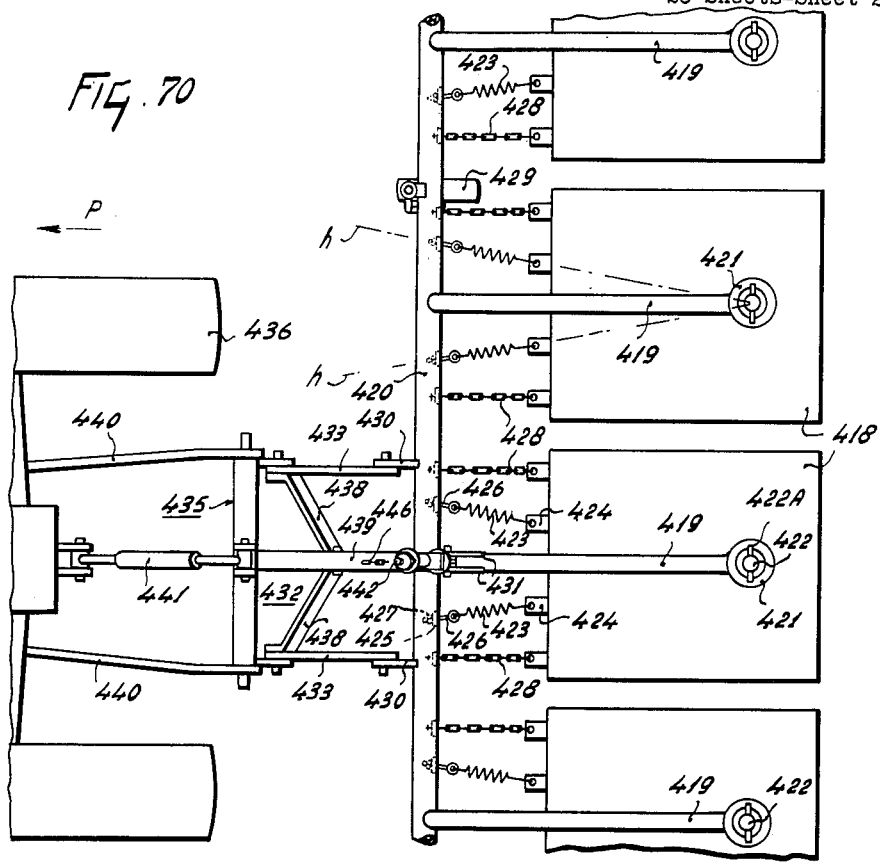
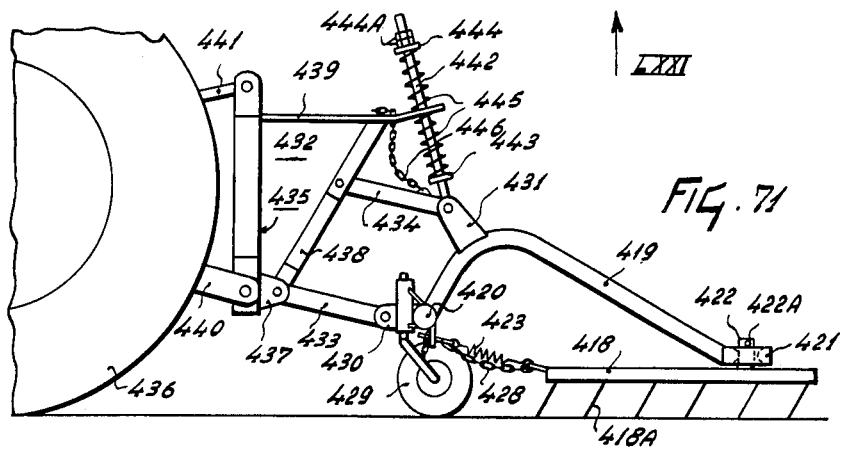

United States Patent Office 3,219,127
Patented Nov. 23, 1965

3,219,127
SOIL CULTIVATING IMPLEMENT
Cornelis van der Lely, Zug, Switzerland, and Ary van der Lely, Maasland, Netherlands, assignors to C. van der Lely N.V., Maasland, Netherlands, a Dutch limited-liability company
Filed Jan. 30, 1962, Ser. No. 169,890
Claims priority, application Netherlands, Feb. 13, 1961, 261,188; Mar. 23, 1961, 262,773; Mar. 24, 1961, 262,821; May 17, 1961, 264,881
6 Claims. (Cl. 172—449)

The invention relates to a soil cultivating implement, particularly a harrow, comprising a frame part to be coupled with a vehicle and having attached to it one or more tined units. The invention has for its object to provide an improvement in the operation of a soil cultivating implement.

In accordance with the invention the frame part and a unit or the units, respectively, have arranged between them a number of coupling members, so that during the travel of the implement a unit performs an oscillatory motion with respect to a point located behind the vehicle, which motion has a component in the travelling direction of the implement and a component transverse to this direction.

According to a second aspect of the invention there is provided a soil cultivating implement, particularly a harrow, comprising a frame part to be coupled with a vehicle and having attached to it one or more tined units, while between the frame part and a unit or the units, respectively, provision is made of a movable set of coupling members, which set comprises at least two coupling members arranged so that their prolongations converge to the rear, viewed in the travelling direction of the implement.

According to a third aspect of the invention there are provided coupling members arranged between the frame part and a unit or the units respectively so that they constitute a deformable quadrangle, wherein the distance between corners lying side by side in the travelling direction is variable.

According to a fourth aspect of the invention there are provided a number of coupling members arranged between the frame part and a unit or the units, respectively, so that they constitute a deformable quadrangle, which is capable of moving not only in its plane but also in a direction substantially at right angles to this plane.

According to a fifth aspect of the invention there are provided a number of coupling members arranged between the frame part and a unit or the units, respectively, so that they constitute a deformable quadrangle, while above the coupling members provision is made of a connecting member extending between a point of the frame part and a point of a unit or of the units, respectively.

According to a sixth aspect of the invention there is provided a tine for use in a soil cultivating implement, wherein the active tine portion is connected by means of a part extending in the travelling direction, with a resilient element, coupled with a supporting member so that the active tine portion is located at a given distance behind the junction between the portion extending in the travelling direction and the resilient element.

According to a seventh aspect of the invention there are provided a number of coupling elements arranged between the frame part and a unit or a number of units, so that the tines of a unit or the units, respectively, perform a reciprocating motion in operation around an instantaneous point of rotation located at a place where few tines or no tines are provided in the distribution range of the tines in a unit or in the units, respectively. An instantaneous point of rotation is to be understood to denote herein the point of rotation around which each harrow unit separately or a number of harrow units in common perform a rocking motion in operation.

The place where few or no tines are provided in the tine distribution range in the unit or the units, respectively, is understood to mean that at the place of the instantaneous point of rotation the tines are spaced apart from this point by a distance which exceeds half the maximum distance between the tines associated with one unit.

With the construction according to the invention all tines are capable of moving so that they remain substantially completely free of weeds and other dirt of the soil.

According to an eighth aspect of the invention there is provided a soil cultivating implement, particularly a harrow, which comprises a frame part to which one or more tined units are attached, while between the frame part and a unit provision is made of two coupling elements which extend partly above a unit and the center lines of which intersect or cross each other, whereas the part of the unit where the coupling elements are secured, viewed in the travelling direction of the implement, is displaced to the front or to the rear, respectively, with respect to the further part of the unit.

According to a ninth aspect of the invention there is provided a soil cultivating implement, particularly a harrow, which comprises a frame part to which one or more tined units are attached, while between the frame part and a unit provision is made of one or more coupling elements, which are coupled with the frame part and the unit, respectively, by means of elastic material.

According to a tenth aspect of the invention there is provided a tine for use in a soil cultivating implement, the active part of which tine is connected by means of a portion extending in the travelling direction of the implement with a connecting member, coupled with a supporting member, while between the portion extending in the travelling direction and the active tine portion provision is made of at least one resilient winding.

According to an eleventh aspect of the invention there is provided a tine for use in a soil cultivating implement, the active part of which tine portion is formed mainly by a blade-shaped member, which is adapted to occupy two positions relative to the further tine portions and shaped in different forms on the lowerside and the upperside.

According to a twelfth aspect of the invention there is provided a soil cultivating implement, particularly a harrow, comprising a frame part to which one or more units with tines are attached, wherein between the frame part and a unit, provision is made of a coupling member, comprising a coupling piece which is coupled with a field near the center thereof, so that in operation a field performs a substantially reciprocating motion around a substantially vertical axis of rotation of the coupling point, which occupies a substantially fixed position with respect to the travelling direction of the implement.

For a better understanding of the invention and to show how the same may be readily carried into effect, reference will now be made to the accompanying drawings, in which:

FIG. 2 is a side elevation in the direction of the arrow II of the implement shown in FIG. 1.

FIG. 3 is an elevation in the direction of the arrow III in FIG. 1 of the locking member between the pivotably coupled beams 2 and 3 of adjacent harrow fields.

FIG. 4 is a plan view of a similar coupling to the coupling of the soil cultivating implement shown in FIG. 1 except that eight bars are included in the coupling piece.

FIG. 5 is a plan view of a coupling piece similar to the coupling shown in FIG. 4.

FIG. 6 is a modification of the connecting member shown in FIG. 4 in plan view and arranged above the coupling piece.

FIG. 7 shows a plan view of a third embodiment of the connecting member.

FIG. 8 is an elevation in the direction of the arrow VIII in FIG. 7.

FIG. 9 is a plan view of a second embodiment of a coupling piece associated with the coupling.

FIG. 10 is a sectional view taken on the line X—X in FIG. 9.

FIG. 11 is a plan view of a third embodiment of a coupling piece associated with the coupling.

FIG. 12 is a plan view of a fourth embodiment of a coupling piece associated with the coupling.

FIG. 13 is a plan view of a fifth embodiment of a coupling piece associated with the coupling.

FIG. 14 is an elevation taken on the line XIV—XIV in FIG. 13.

FIG. 19 is a plan view of the lower part of the coupling shown in FIG. 18.

FIGS. 20, 21 and 22 show various possibilities of arranging the bars shown in FIG. 19.

FIG. 23 shows on a reduced scale the plan view of FIG. 19, while on either side of the bars provision is made of springs.

FIG. 24 shows on the same scale as FIG. 19 the method of fastening a bar.

FIG. 25 is a sectional view taken on the line XXV—XXV in FIG. 24 turned 180°.

FIG. 26 is a plan view of a second embodiment of the part of the coupling shown in FIG. 19, according to the invention.

FIG. 27 shows a plan view of a third embodiment of the part of the coupling according to the invention shown in FIG. 19.

FIG. 28 is a plan view of the lower arms of a three-point hitch device, provision being made of an auxiliary member serving for coupling the implement according to the invention.

FIG. 29 is a sectional view taken on the line XXIX—XXIX in FIG. 28.

FIG. 30 is a plan view of a third embodiment of the coupling of an implement according to the invention, the soil cultivating members being shown diagrammatically, these members being movably coupled with a common support.

FIG. 31 is an elevation in the direction of the arrow XXXI in FIG. 30.

FIG. 32 shows a third embodiment of the coupling of an implement according to the invention.

FIG. 33 is an elevation in the direction of the arrow XXXIII in FIG. 32.

FIG. 34 shows on an enlarged scale an elevation taken on the line XXXIV—XXXIV in FIG. 32.

FIG. 35 is an elevation in the direction of the arrow XXXIII in FIG. 32, but showing a modified form of the resilient element.

FIG. 36 is a plan view of a second embodiment of a soil cultivating implement according to the invention, in which the tined unit is shown diagrammatically.

FIG. 37 is an elevation taken in the direction of the arrow XXXVII in FIG. 36.

FIG. 38 shows on an enlarged scale an elevation taken on the line XXXVIII—XXXVIII in FIG. 36.

FIG. 39 shows on an enlarged scale an elevation taken on the line XXXIX—XXXIX in FIG. 37.

FIG. 40 shows on an enlarged scale a plan view of the coupling of the soil cultivating implement, while the adjusting device for the coupling points of the coupling elements is shown in a second embodiment.

FIG. 41 shows on an enlarged scale part of the adjusting device for the coupling points of the coupling elements in the second embodiment of FIG. 40.

FIG. 42 shows the part of FIG. 41, in which, however, a second embodiment of the fastening of a coupling element is shown.

FIG. 43 is an elevation taken on the line XLIII—XLIII in FIG. 42.

FIG. 44 shows on an enlarged scale a plan view of the structure of the part 222 and of a portion of the part 223 of the unit shown diagrammatically in FIG. 36.

FIG. 45 is an elevation taken on the line XLV—XLV in FIG. 44.

FIG. 46 is an elevation taken on the line XLVI—XLVI in FIG. 44.

FIG. 47 is a plan view of a third embodiment of a soil cultivating implement according to the invention, in which the units are again shown diagrammatically.

FIG. 48 is a plan view of a fourth embodiment of a soil cultivating implement according to the invention, with units shown diagrammatically.

FIG. 49 shows on an enlarged scale a plan view of the structure of the part 314 of the unit shown diagrammatically in FIG. 48.

FIG. 50 is an elevation taken on the line L—L in FIG. 49.

FIG. 51 is an elevation taken in the direction of the arrow LI in FIG. 50.

FIG. 52 is also an elevation taken in the direction of the arrow LI in FIG. 50, the blade of the tine being, however, turned through 180°.

FIG. 53 is a plan view of the embodiment of FIG. 48 of the soil cultvating implement according to the invention, in which a different coupling is shown.

FIG. 54 is a plan view of a fifth embodiment of a soil cultivating implement according to the invention with a unit shown diagrammatically.

FIG. 55 shows on an enlarged scale a plan view of the structure of the part 324 of the unit shown diagrammatically in FIG. 54 of the soil cultivating implement.

FIG. 56 is an elevation taken on the line LVI—LVI in FIG. 55.

FIG. 57 is a plan view of a sixth embodiment of a soil cultivating implement according to the invention.

FIG. 58 is an elevation taken on the line LVIII—LVIII in FIG. 57.

FIG. 59 is a plan view of a seventh embodiment of a soil cultivating implement according to the invention.

FIG. 60 is an elevation taken on the line LX—LX in FIG. 59.

FIG. 61 is a plan view of an eighth embodiment of a soil cultivating implement according to the invention, in which the units are shown diagrammatically.

FIG. 62 is a plan view of a ninth embodiment of the soil cultivating implement according to the invention, in which the units are also shown diagrammatically.

FIG. 63 is a plan view of a tenth embodiment of the soil cultivating implement according to the invention.

FIG. 64 is an elevation taken in the direction of the arrow LXII in FIG. 63.

FIG. 65 shows on an enlarged scale an elevation taken in the direction of the arrow LXIII in FIG. 63.

FIG. 66 is a plan view of an eleventh embodiment of the harrow according to the invention.

FIG. 67 is an elevation taken in the direction of the arrow LXVII in FIG. 66.

FIG. 68 shows on an enlarged scale a sectional view taken on the line LXVIII—LXVIII in FIG. 66.

FIG. 69 is an elevation taken on the line LXIX—LXIX in FIG. 66.

FIG. 70 is a plan view of a twelfth embodiment of a harrow according to the invention.

FIG. 71 is an elevation taken in the direction of the arrow LXXI in FIG. 70.

Figure 1:
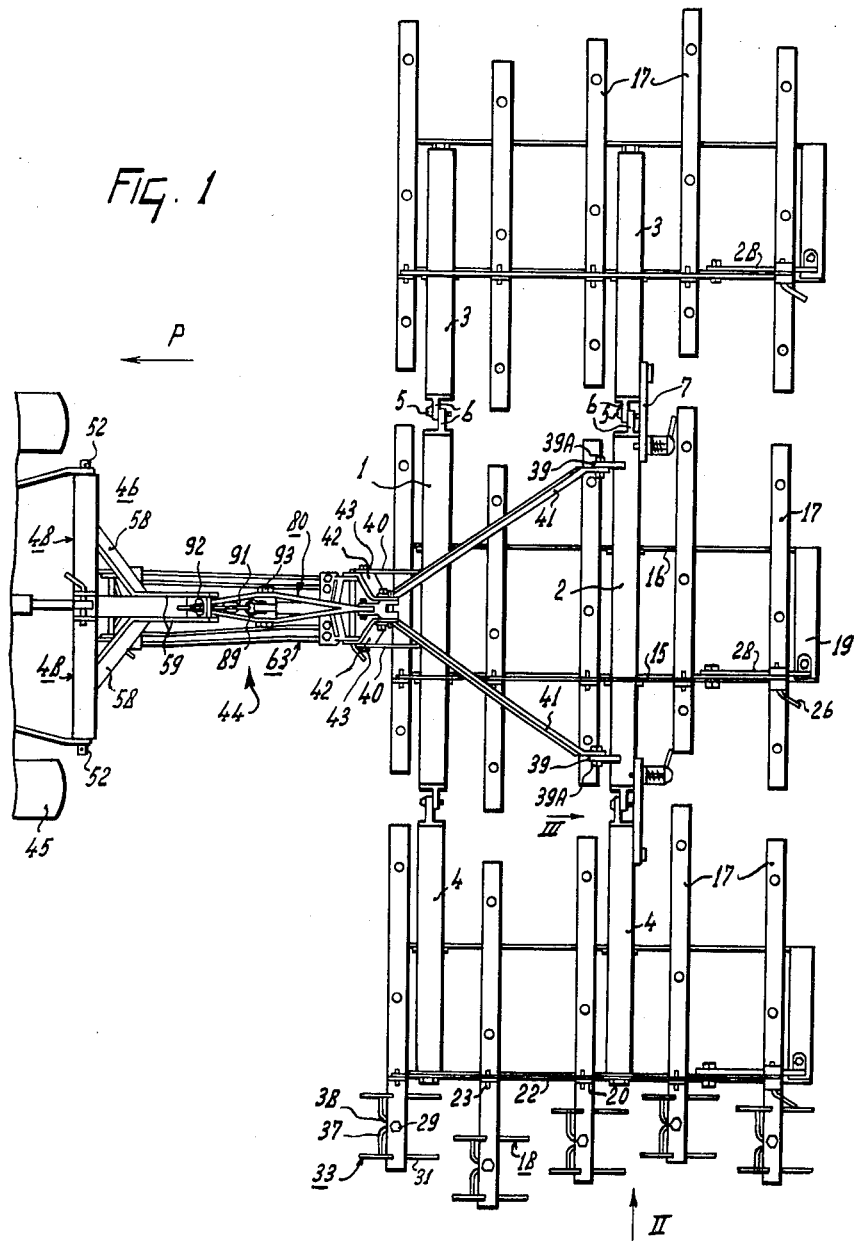
FIG. 1 is a plan view of a soil cultivating implement according to the invention.

The soil cultivating implement shown in FIGS. 1 and 2 is shaped in the form of a harrow, which comprises a frame formed by two parallel beams 1 and 2, extending transversely to the travelling direction. At the ends of each beam 1 and 2 provision is made of beams 3 and 4 respectively. The connection is established by substantially horizontal pivotal shafts 5, the beams 3 and 4 being parallel to the beams 1 and 2, respectively. The pivotal shafts 5 extend substantially in the travelling direction P of the implement and are journalled in bearings 6, provided at the respective ends of the beams. Near the end of the beams 3 and 4, connected with the beam 2 provision is made of an arcuated strip 7, which extends towards the side of the beam 2 and above the latter (see FIG. 3). This strip is provided with holes 8. Near each end of the beam 2 provision is made of a substantially vertical strip 9, to which an S-shaped strip 10 is attached. Through opposite holes in the strips 9 and 10 is taken a pin 11, which is surrounded between the strip 10 and a ring 12 on this pin by a spring 13. On the side of the ring 12 remote from the spring a pin 14 is taken through a hole in the pin 11. The pin taken through the holes in the strips 9 and 10 may also be inserted into one of the holes 8 of the arcuated strip 7. The beams 1 and 2, like the beams 3 and 4, are interconnected by strips 15 and 16, extending substantially parallel to the travelling direction of the implement and are spaced apart from each other by a given distance. At substantially equal distances five supporting members 17 are arranged on these strips, these members having tines 18. Thus a set of harrow units is formed, which units are completely identical, so that hereinafter the description of a single harrow unit may suffice.

The harrow unit chosen to this end is formed by the beams 1 and 2, interconnected by the strips 15 and 16, and by the supporting members 17, provided with the tines 18. The strips 15 and 16 are slightly curved upwardly at their ends lying on the front side of the harrow unit and fastened to the lower sides of the beams 1 and 2, respectively. On the rear side the strips 15 and 16 are interconnected by a beam 19. The supporting members 17 are located above the strips 15 and 16 and secured thereto by means of arms 20 (see FIG. 2). The arms 20 are provided with shafts 21, which are adapted to turn in bearings provided in the strips 15 and 16. A rod 22 is provided above the strip 15. By means of pivotal shafts 23 the said rod is connected with the top ends of the arms 20. The arms 20 of the strip 15 of the hindmost supporting member 17 are provided with a prolongation 24, on which a curved strip 25 is arranged. Through holes in the prolongation 24 and the curved strip 25 is taken a pin 26, which is adapted to co-operate with holes 27 in a bracket 28, fastened to the strip 15 and the beam 19. The supporting members 17 are provided with equidistant tines 18, which are secured to the supporting members by means of bolts 29 and clamping pieces 30. A tine 18 is made from spring steel and comprises two portions 31 and 32, of which the portion 31 extends in the travelling direction of the implement and the portion 32 extends downwardly in the travelling direction. The portion 32, which constitutes the active tine portion, is bent over at its free end in the travelling direction. At its end remote from the portion 32 the portion 31 merges in a U-shaped portion 33, having limbs 34 and 35. Via a link 36 the limb 35 merges in the limb 34, which is connected with the portion 31 and is substantially orthogonal thereto. The active portion 32 is located at a given distance behind the junction of the portion 31 and the limb 34 of the U-shaped part, which constitutes a resilient connecting element.

The limb 35 is connected by means of a connecting part 37 with the limb 35 of the U-shaped part of an adjacent tine. At the center of the connecting part 37 provision is made of an arcuate part 38 in order to secure the integral tines to the supporting member 17.

Near its ends the beam 2 is provided with tags 39, whereas the beam 1 is provided, near its center, with supports 40, arranged at a given distance from each other. From the tags 39 extend two beams 41, bent over towards each other in the travelling direction and extending substantially parallel to the supports 40, to which they are attached by two beams 42. The beams 41 are secured to the tags 39 by means of bolts 39A. The beams 42 extend from the beams 41 in downward direction and in the travelling direction of the implement beyond the supports 40. Near their lower ends the beams 42 are spaced apart by a larger distance than near their junctions with the beams 41. The beams 42 are secured by means of bolts 43 to the beams 41 and the supports 40, respectively.

The harrow is coupled with a tractor 45 with the aid of a coupling member 44, which is arranged between the beams 42 and a frame part 46 (see FIGS. 2 and 4). The frame part 46 comprises a substantially horizontal beam 47, which is provided at its ends with strips 48. These strips extend over a part 49 in downward direction and are then bent over towards the center of the beams. Initially they extend over a part 50 parallel to the beams, after which they are bent over towards the beams via a part 51. The downwardly orientated part 49 is provided with substantially horizontal pins 52, which are located on either side of the said part. In upward direction the strips 48 extend over a part 53, which parts initially converge and then extend parallel to each other. Near the top ends the parts 53 are interconnected by a transverse piece 54 and are provided with holes 55 and 56. The pins 52 and the holes 55 and 56 serve for fastening the frame part 46 to the three-point hitch device of the tractor 45.

From the beam 47 two beams 57 extend obliquely to the rear. From the beam 47 these beams are bent over towards each other over a part 58 and then extend parallel to each other. The parallel parts 59 of the beams are connected by means of two supports 60 and 61 with the strips 48. The support 60 is secured to the top sides of the parts 59 and extends from the parts 59 to the upper sides of the strips 48. The support 61 extends from the lower sides of the parts 59 towards the same junction at the strips 48. On the side of the beam 47 facing the implement provision is made of two tags 62, which, like the ends of the lower sides of the beams 42, are provided with a hole. Between these tags and the ends of the lower sides of the beams 42 is arranged part of the coupling member 44. This part is formed by a coupling piece 63 (see FIGS. 1 and 2). The coupling piece 63 is provided at its ends with two strip-shaped supports 64 and 65, which are provided with tags 66 and 67 and extend substantially parallel to each other. Pins 68 are taken through holes in these tags and in the tags 62 and the lower sides of the beams 42 in order to fasten the coupling piece 63 between the tractor 45 and the implement. The distance between the tags 66 and 67, respectively, and the tags 62 and the lower sides of the beams 42, respectively, is the same. Between the supports 64 and 65 of the coupling piece 63, groups of bars 69 are arranged with a given intermediate distance; these bars are made from spring steel and have a circular section. The bars of each group are arranged side by side and near the supports provided with a U-shaped part 70, which extends in upward direction away from the bars. The length of the limbs 71 of the U is in this case approximately one sixth of the length of the coupling piece. The distance between the groups of bars on the support 64 is smaller than that on the support 65. Thus the prolongations of the parts 72 located between the U-shaped parts converge in rearward direction. The ends of the bars are fastened to the supports by means of clamping pieces 73 and bolts 74. The clamping pieces are provided on the side, facing the supports with grooves for accommodating partly the bars in order to prevent displacement thereof.

The supports 64 and 65 are provided, midway between the two groups, with extensions 75 and 76, respectively (see FIG. 5), extending parallel to a plane at right angles to the supports. These extensions are interconnected by means of resilient strips 77, capable of withstanding tensile stress. These strips are fastened on either side of the extensions by means of bolts 78 and clamping pieces 79.

On the upper side of the beams 42, just above their junction at the beams 41, provision is made of a connecting member formed by a rod 80, which extends parallel to the coupling piece 63 and is connected with the beams 57 of the supporting structure 46 (see FIG. 2). The fastening point of the rod 80 to the harrow is located behind the fastening point of the coupling piece 63. The rod 80 is formed by a plurality of resilient strips 81 of rectangular section, arranged between two supports 82. The supports 82 are to this end provided with a recess 83 for accommodating the ends of the strips. These ends are clamped tight by means of a bolt 84 in the recess 83. Approximately at the center between the supports 82 the strips 81 have arranged between them a spacer 85, which is held in place by means of a bolt 86. The supports 82 are adapted to hinge about a shaft 87, which is journalled in the beams 42 and 57, respectively. The spacer 85 is provided on the uppper side with an extension 88, to which a ring 89 is attached so as to be pivotable about a shaft 90. The ring 89 has secured to it a chain 91, which can be arranged in a recess 92 of the support 60, secured to the beams 57 (see FIGS. 1 and 4).

From FIG. 6 it will be seen that between the strips 81 a plurality of spacing sleevs 93 may be arranged instead of a spacer 85, which sleeves are held in place by a bolt 93A.

FIGS. 7 and 8 show a third embodiment of the rod 80. With this structure bars 95A are arranged between the supports 94, which bars are similar to the bars 69, used with the coupling piece 63. The supports 94 are provided with a strip 95 in order to obtain a pivotal joint with the beams 42 and 57, respectively. The U-shaped part 96 of the bars 95 is located near the supports 94. The bars 95 extend parallel to each other between the supports and are secured to the supports 94 in the manner described by clamping pieces 97 and bolts 98. On the upper and lower sides of the bars 95 provision is made of elongated plates 99. These plates are held at a given distance from the bars by means of spacing sleeves 100, while at the center they have a curved part 101, which engages the bars. By means of bolts 102 the spacing sleeves are held in place.

FIGS. 9, 11, 12 and 13 show various embodiments of the coupling piece. The coupling piece 103, shown in FIG. 9 is provided with supports 104, the ends of which are provided with tags 105. Similarly to the coupling pice 63, described above, the tags 105 are provided with holes adapted to co-operate with holes in the tags 62 on the beam 47 of the frame part 46. Holes are also provided in tags 106 on the implement. Through these holes a pin 107 can be taken, which is secured in place at one end by means of a pin 108. On the facing sides the supports 104, preferably made from malleable cast iron, are provided with a U-shaped part 109 and 110, respectively. The part 110 is shorter than the part 109. Between the limbs of the U-shaped parts are arranged bars 111, having a rectangular section and being made from spring steel (see FIG. 10). The ends of the bars are arranged between the limbs of the U-shaped part, while the long rectangular side extends from one limb towards the other limb. The ends are provided with holes 112 and on their short rectangular side with a recess 113, co-operating with a protuberance 114, provided on the inner side of the limbs of the U-shaped part. This protuberance 114 extends in the longitudinal direction of the U-shaped part. Between the limbs of the U-shaped part provision is made of two extensions 115, rigidly secured to the limbs. These extensions are arranged near the ends of the U-shaped part between the two outer bars. The ends of the bars located within the extensions 115 are held at a given distance from each other between the limbs of the U-shaped part 109 and 110, respectively, by intermediate pieces 116 and 117 respectively. The intermediate pieces 117 are shorter than the intermediate pieces 116, so that the ends of the bars between the limbs of the U-shaped part 110 are nearer each other than the ends of the bars arranged between the limbs of the part 109. The extensions 115 and the intermediate pieces 116 and 117 are provided with holes corresponding with holes 112 in the ends of the bars. Through the corresponding holes are taken bolts 118.

The coupling piece 119 shown in FIG. 11, is provided with supports, constructed and arranged in the same manner as the supports described with reference to the preceding embodiment, so that the same reference numerals are employed. On the facing sides the supports are provided with tags 120 and 121, respectively. The distance between the pairs of tags 120 exceeds the distance between the pairs of tags 121, whereas the relative distance between the tags of one pair with the tags 120 is smaller than with the tags 121. Between the pairs of opposite tags provision is made of bars 122, which are shaped similarly to the bars 111 of the preceding embodiment, and are also made from spring steel. In order to fasten the bars, their extensions are clamped tight between the respective pairs of tags. Between each pair of tags 120 and 121 provision is made of spacing rings 123 and 124, respectively, of which the spacing rings 123 are narrower than the rings 124, so that the ends of the bars arranged between the tags 121 are spaced apart by a larger distance than the ends of the same bars arranged between the tags 120. The tags, the end of the bars and the spacing rings are provided with corresponding holes, through which bolts 125 are taken.

The coupling piece 126 shown in FIG. 12 is also provided with supports similar to the supports of the coupling pieces of the preceding embodiments, so that also in this case the same reference numerals are used. Between the facing sides of the supports of this coupling piece are also provided pairs of tags 127 and 128, respectively. The distance between the pairs of tags 127 is smaller than the distance between the pairs of tags 128. Between each pair of tags are arranged two bars 129, which are similar to the bars of the two preceding embodiments. In order to fasten the bars their ends are provided with holes corresponding with holes provided in the pairs of tags. With the aid of bolts 130 the bars are clamped tight between the tags. Approximately midway between two bars arranged between opposite pairs of tags the bars have arranged between them spacers 131, which are held in place by bolts 132.

The coupling piece 133 in the embodiment shown in FIG. 13 comprises two supports 134, which may be coupled in the manner described above with the vehicle or the implement, respectively. To this end the supports are provided with tags 135, whereas the vehicle or the implement, respectively, is provided with tags 136 and 137 respectively, and through the holes in the respective tags, pins 138 are taken. Between the supports 134 are arranged bars 139, having a circular section and bent over at their ends. On the facing sides of the supports provision is made of bearings 140 and 141, respectively, the distance between the bearings 140 exceeding the distance getween the bearings 141. The bearings are arranged so that one bearing is fastened at the center of each support, so that a single bar may be used. With their bent-over ends the bars 139 are journalled in the bearings, which occupy a substantially vertical position when the implement is in operation. For this purpose each bent-over end is provided with a shoulder 142, by means of which the bar bears on the bearing, while the end 143, projecting beyond the bearing, is provided with a hole through which a pin 144 can be taken (see FIG. 14). This pin may be a safety pin, for example of the kind shown in FIG. 24.

Before passing to the description of the operation of the implement shown in the figures, the following should be noted. The coupling of a soil cultivating implement with the tractor is very important with a view to a satisfatcory, uniform working of the soil. With tined soil cultivating implements, as with the harrow shown in FIGS. 1 and 2, a satisfactory operation requires essentially that during its travel the implement should drag its tines through the soil so that the strip of land over which the implement is drawn is completely worked and no voids are left. This requires in the first place a great freedom of movement of the implement. Thus the tines will not follow a single straight path, but will move during the travel in different directions through the soil, so that a "breaking-up" effect is obtained and, hence, a very intense working of the soil results. A part from a direct action upon the working of the soil results. A part from a direct action upon the working of the soil, the aforesaid freedom of movement of the soil cultivating implement has an indirect influence, since a cleaning effect is obtained for the tines, since a tine is never in a rest position, so that dirt of the field or the weeds torn up by the tines cannot stick to the tines. The motion of a tine is such that it jumps forwardly and is then braked, so that weeds are shaken off the tines.

Figure 15:
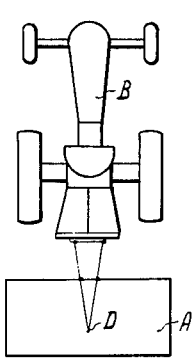
FIGS. 15, 16 and 17 show diagrammatically a plan view of a soil cultivating implement according to the invention coupled to the rear of a tractor.

The movement of the soil cultivating implement described above is obtained by using the structure according to the invention. With this structure the frame part and a unit or the units, respectively, have arranged between them a number of coupling members so that during the travel of the implement a field performs an oscillatory motion around a point located behind the vehicle to which the implement is coupled, which motion has a component in the travelling direction of the implement and a component transverse to the said direction. At least two coupling members are arranged in this case with respect to the travelling direction of the implement so that their prolongations converge to the rear (see FIG. 15).

Figure 16:
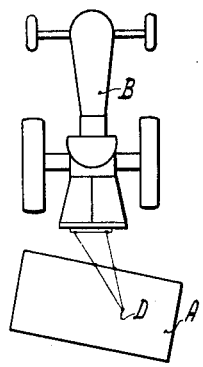
Figure 17:
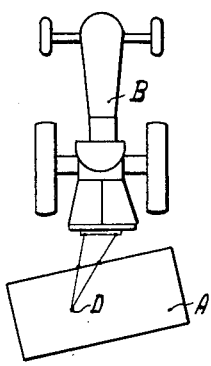

The point D, where the prolongations of the coupling members intersect or cross each other, coincides in this case with the point of application of the resultant of the forces exerted on the tines of a field during the travel. During the travel the tines are exposed to different resistances, so that now a tine is retained and now allowed to jump forwardly, a field thus performing an oscillatory motion around the point D, which, as will be seen from FIGS. 15, 16 and 17 which show a harrrow A coupled with a tractor B in accordance with the invention, is located behind the tractor. As stated above the motion of a field has a component in the travelling direction of the implement and a component transverse to this direction. Near the sides of a unit the first-mentioned component is greater than or equal to the last-mentioned component. The motion of a unit is accelerated and becomes resilient owing to the special structure of the coupling members, which may be made from resilient material, as stated above, or may be arranged by means of torsional bars 71. Moreover, the springs arranged at the sides of the coupling members act upon the said motion. During the motion of a unit the coupling members are capable of pivoting about axes extending in a substantially vertical direction.

From FIGS. 2 and 4 it will be seen that the torsional bars 71 constitute so to say a pivotable quadrangle, having its corners near the supports of the coupling piece. The resilience obtained by the torsional bars provides a vigorous motion of the unit during the travel.

From FIG. 1 it is evident that the coupling piece 63 with the rod 80, arranged above it, constitues a pivotable parallelogram structure, so that a uniform penetration depth of the harrow is ensured.

From the above description it will be seen that the rod 80 is composed of a packet of springs, so that for the motion of a unit as described is not at all hindered by this rod. At the upper end the rod 80 is connected by means of a chain 91 with the upper side of the beams 57, associated with the frame part. The support 60, which interconnects the parts 59 of the beams 57, is provided with a recess 92, for accommodating a chain link. It is thus possible to control the penetration depth of the harrow by varying the pressure of the harrow on the soil. If during operation the harrow bears with its full weight on the gound, the chain is in a slack state. The chain is futhermore employed for the transport of the harrow. Since the rod is uniformly under strain of pressure the bars are spread at the center in order to avoid kinking. With the embodiment of the rod shown in FIGS. 7 and 8, elongated plates 99 are arranged on either side of the bars, which are constructed in the same way as the bars 69 used with the coupling piece 63 and which have the same effect, which plates engage the bars by means of a curved portion 101. This structure is also intended for avoiding kinking.

From FIGS. 1 and 2 it will furthermore be seen that the coupling piece 63, by removing the pins 68, can be readily detached and be re-arranged in a reverse position. The point of application D of the tensile force is displaced to a point lying in front of the implement, whereas the motion of a unit is braked or suppressed, so that subsequent to the intense working of the soil, a flat sowing field may be made.

It will be obvious that the implement equipped with a coupling piece as shown in FIGS. 10, 11, 12 and 13 operates in the same manner. With the coupling piece shown in FIG. 13 use may be made of a single bar, as will be seen from the figure. When this coupling piece is employed, the motion of a harrow unit is attenuated, since the resilient support is lacking. The use of a single bar results in a further reduced motion. However, this motion is still sufficient for a satisfactory working of the soil.

The tine shown in FIGS. 1 and 2, with which the harrow of FIG. 1 may be equipped, is capable of turning, owing to its resilient fastening, so that a small turn provides already a fairly large deflection, the tine maintaining, however, the position required for the cultivation of the soil. When during the travel of the tine of the harrow is stressed, the limb 34 of the U-shaped part 33, together with the tine, is capable of deflecting rearwardly, whereas the part 31 is capable of deflecting upwardly by turning about a point located near the junction of this part with the limb 34, so that a deformation of the active portion 32 of the tine is practically completely avoided and the position thereof is substantially not changed. During the motion of a unit a tine is capable of deflecting resiliently around the torsional bars formed by the limbs 34 and 35 of the U-shaped part 33. The position of the tines fastened to the supporting member 17 may be adjusted in a simple manner with the aid of the prolongation of the arm 20, provided on the rear side of each harrow unit, which is important for adapting the harrow to the kind of cultivation and to the nature of the soil (see FIG. 2), while at the same time the motion of a unit can be acted upon by this adjustment.

From FIG. 1 it will be seen that the outer harrow units can be tilted up, so that the transport of the harrow is facilitated. With the aid of the locking pins 11, which can be inserted into the holes 8 of the arcuated strip 7, the outer units can be locked in the operational position and in the transport position.

Figure 18:
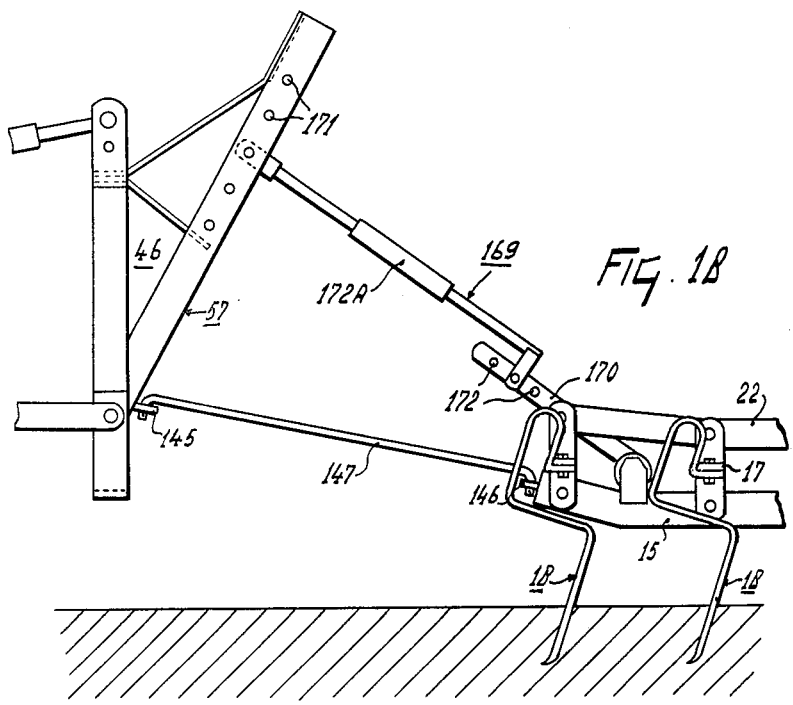
FIG. 18 is a side elevation of a second embodiment of a coupling, the soil cultivating implement of FIGS. 1 and 2 being shown partly.

FIG. 18 shows a further embodiment of the coupling of the implement according to the invention. The harrow, which is identical to that of FIG. 1, is shown only partly. With this coupling the beam 47 of the frame 46 is provided with a support 145, whereas the harrow is provided with a support 146. Between these supports are arranged bars 147, the ends of which are bent over and accommodated in holes 148 in the supports concerned (see FIGS. 19 to 23). The holes in the supports 145 and 146 have a convex shape so that the ends of the bars inserted into them have a large freedom of movement on all sides. The ends of the bars are secured by means of a safety pin 149 (see FIGS. 24 and 25), which can be inserted into a hole provided in the end of a bar. The pin 149 is bent over in the form of a U and is made from resilient material. A limb 150 can be inserted into the hole at the end of the bar for locking purposes. The other limb 151 is bent over so that it partly surrounds the bar.

From FIG. 23 it will be seen that on either side of the bars provision may be made of springs 152, the ends of which may be accommodated in one of the holes 148 of a support 146. The other end of a spring 152 is coupled with a bar 153, which can be inserted into a hole in an extension 154, provided on the beam 47 of the frame part 46. The end of the bar 153 taken through the hole in the extension 154 is provided with screw thread onto which a nut 155 can be screwed.

Instead of using supports 146 and 147, use may be made of tags 156 and 157 on the frame part and on the harrow, respectively (see FIG. 26). The distance between the tags 156 exceeds the distance between the tags 157. Between the tags 156 and 157 are arranged a number of engaging leaf springs, which together form a rod 158. This rod 158, constituted by a packet of leaf springs, is freely rotatable by its ends around shafts 159, formed by the center lines of bolts 160. Onto the bolts 160 are screwed nuts 161.

In the embodiment shown in FIG. 27 the frame part 46 and the harrow are provided, between supports 162, with guide bars 163. Along these guide members are adapted to slide supports 164, which are formed by sleeves 165, arranged around the guide members and provided with extensions 166. An extension 166 is provided with a hole for accommodating the bent-over end of a bar 167, which may be locked in known manner. By means of bolts 168 the supports 164 can be secured in place subsequent to the displacement with respect to the guide member 163.

From FIG. 18 it appears that above the set of coupling members provision is made of a connecting member formed by a rod 169, which is pivoted to the beams 57 of the frame part 46 and to a strip 170 provided on the harrow. The strip 170 is located in this case behind the junctions of the coupling members on the support secured to the harrow, whereas the prolongation of the rod 169 intersects the plane going through the coupling members at a point also lying behind the said junctions. The beams 57 are provided with a plurality of holes 171, which are arranged one above the other. The strip 170 extends substantially in the travelling direction of the harrow and is provided with a row of holes 172. The rod 169 is provided with a union nut 172A for the adjustment of its length.

From FIGS. 19, 20 and 22 it appears that the bars may be arranged in different positions between the supports for displacing the point of application D of the tensile force. In FIG. 22 the point of application D is located closely behind the foremost working members of the implement, whereas in the position of the bars shown in FIGS. 19 and 23 the said point is displaced considerably to the rear. In the position shown in FIG. 20 of the bars the point of application D is located in front of the working members, so that the motion of a unit is reduced. This position therefore corresponds with the reverse position of the coupling piece in the embodiments shown in FIGS. 1 to 14.

In order to intensify the motion of a unit, the springs 152 may be arranged on either side of the bars (see FIG. 23). The distance between the ends of the springs on the support 146 is variable by inserting one end into a different hole 148 of the support. The tension of the springs is variable by turning the nuts 155.

From FIG. 21 it appears that alternatively one bar may be used. In the embodiment shown in FIG. 27 the bars may be arranged, within given limits, in any desired position.

From FIGS. 19, 20, 22, 23, 26 and 27 it will be seen that the coupling members with their supports constitute a deformable quadrangle, in which the distance between corners lying side by side in the travelling direction is variable.

The motion of a field obtained by this coupling corresponds with that obtained by means of the coupling shown in FIGS. 1 to 14. The use of the coupling described above permits a field to perform, in addition, a so-called "step" motion. This means that the sides of the harrow lying each on one side of the coupling are capable of moving alternately upwards and downwards, while the quadrangle formed by the coupling members and the supports is movable not only in its plane but also in a direction substantially at right angles to this plane.

From FIG. 18 it will be seen that the bar 169 is adjustable in a direction of height. This adjustment serves for reducing the pressure of the implement on the ground, so that the penetration depth is diminished. If the bar 169 is inserted into a hole 172 of the strip 170 farther to the rear, the pressure on the implement is increased, which may be required for working hard soil. Since the bar 169 is accommodated with a given amount of play in the holes of the strip 170 and in the hole of the beams 57, the motion of a unit is not hindered in operation.

Since it is important that the motion of a unit of the implement according to the invention should not be attenuated, it is necessary to prevent the supporting structure of the vehicle from swinging laterally. To this end the auxiliary member shown in FIG. 28 may be employed, which prevents the arms 173 of the three-point hitch 174 of the tractor 175 from deflecting laterally. This auxiliary member comprises a beam 176, which is secured by means of strips 177 to the supporting beam 178, arranged between the lower arms 173 of the three-point suspension gear 174. The strips 177 are fastened to the supporting beam by means of brackets 179 and 180 (see FIG. 29). The brackets are clamped around the supporting beam by means of bolts 181. At the ends remote from the supporting beam 178 the strips 177 are fastened to the beam 176. This beam bears on the arms 173. The ends of the strips are furthermore provided with set screws 182 for locking the arms 173.

The implement shown diagrammatically in FIG. 30 is formed by a harrow having three harrow units of the kind shown in FIG. 1 arranged side by side on a common supporting beam 183. The harrow units are linked to the supporting beam 183 by means of chains 184. The supporting beam 183 is coupled with the three-point lift 188 of a tractor 189 by means of the bars 185, which are inserted into holes 186 of supports 187. This coupling corresponds with the coupling structure shown in FIGS. 18 to 27. It will be obvious, however, that a coupling piece of the kind shown in FIGS. 1 to 14 may be employed. Above the set of coupling members provision is made of a connecting member formed by a rod 190, which is prvoided with a transverse beam 191 at its end located above the harrow. This transverse beam 191 is located at a distance from the front side of a harrow unit equal to two-thirds of the length of a harrow unit. The transverse beam 191 is provided with apertured extensions 192, which surround pins 193, provided in the harrow units. The other end of the rod 190 is adapted to turn about a shaft 194 in a hole of a strip 195 fastened to the three-point lift 188 of the tractor 189. During the travel of the harrow the units are capable of performing the motion described above, while at the same time they can match the unevennesses of the soil independently of each other. During the travel a movement in the direction of the arrow F in FIG. 31 is concurrently performed. It is thus ensured that the central harrow unit, which might be blocked sooner than the other units by adhering dirt, is yet thoroughly cleaned.

With the coupling shown in FIG. 32, use is made of a coupling piece which is arranged by means of its supports 196 and 197 and pins 198 between pairs of tags 199 and 200 on the frame part 46 and a frame beam, respectively, of a unit. The supports are provided with bearings 201 and 202, respectively, of which the bearings 202 are located on the side of the support 197 facing the unit, whereas the bearings 201 are fastened to the side of the support 196 remote from the frame part 46. The bearings accommodate the ends of bars 203 (see FIG. 33) in the manner described above. On either side of the bars 203 provision is made of connecting members formed by chains 204 and 205, respectively. These chains are spaced apart by equal distances from the longitudinal center line of the set of coupling members formed by the bars 203. Between the chains 204 and 205 provision is made of a cylindrical housing 206, comprising a bar 207, one end of which projects from the housing. This bar is provided at one end with an eye 208, through which is taken a chain link, whereas at the other end provision is made of a guide member 209, which serves as a stop for a spring 210, which surrounds the bar 207 between the said guide member and a wall of the housing. On the side of the housing 206 from which the bar 207 protrudes, provision is made of a detachable hood 211, which is provided with screw thread adapted to co-operate with screw thread provided on the housing.

At equal distances from the tags 199, on either side thereof, the frame part 46 is provided with supports 212, provided with a recess. This recess is shaped so that it may serve for accommodating a chain link. On either side of the tags 200 and at equal distances therefrom the frame beam of the unit is provided with bores through which is taken a bar 213, secured to the chains 204 and 205, respectively. This bar is coupled with a chain link by means of an eye 214 and is provided at its free end with screw thread for receiving nuts 215.

Instead of using the spring 210 provided in the housing 206 between the chains 204 and 205, respectively, use may be made of the structure shown in FIG. 35. In this case the chains 204 and 205 are connected on the sides of the field with a bar 216, while a chain link is taken through an eye 217, secured to the bar. The bar 216 is taken through a hole in the tags 218 on the frame beam of a unit. These tags are located at the same place as the bores referred to above. The bar is surrounded on the side of a tag 218 remote from the chains, between this tag and a stop 219, by a spring 220. The stop 219 is held by nuts 221 and is displaceable along the bar by turning the nuts, so that tension of the spring is variable.

With the coupling described above the motion of a field can be performed with greater vigor by means of the two connecting members arranged each on one side of the bars between a unit and the frame part, comprising each a resilient member, the center lines of these connecting members converging with each other.

From the figure it will be seen that in this embodiment, viewed from above, the connecting members are located each on one side of the coupling members. It appears furthermore from the figure that the center lines of the connecting members converge to the front viewed in the travelling direction P. With this position of the connecting members the effect of the resilient elements provided therein is found to greatly influence the reciprocating motion of the fields. With the aid of the nuts 215 the tension of the spring 210, arranged in the housing 206, can be varied.

The length of the connecting members may be varied by means of the recesses provided in the supports 212 for accommodating a chain link.

Although this is not illusrtated in the figures, the coupling of an implement according to the invention may, of course, also be employed for linking the harrow behind an agricultural implement drawn on itself. It will furthermore be obvious that use may be made of a single harrow unit.

The implement shown in FIG. 36 is a harrow, of which a unit comprising three portions 222, 223 and 224 is shown diagrammatically and is provided with tines 225 (see FIG. 37). The portions 222 and 224 are linked to the portion 223 by means of pivotal joints 226. The pivotal joints are provided with pivotal shafts 227, which extend mainly in the travelling direction of the harrow. The portion 223 is provided on the upper side with a beam 228, extending substantially transversely to the travelling direction. Near its ends this beam is provided with beams 229 and 230, respectively, which extend to the rear and converge in this direction, viewed in the travelling direction V of the harrow. The beams 229 and 230 are interconnected by means of a beam 231, which is substantially parallel to the beam 228. From the figure it will be seen that the beam 231 is located behind the unit, viewed in the travelling direction of the harrow. Near each end, at equal distances from the center of the beam 231, provision is made of strips 232, which extend upwardly towards each other (see FIG. 38). The obliquely approaching parts 233 of the strips 232 terminate in parts 234, which extend parallel to each other up to their ends. Between the parts 234 provision is made of an intermediate piece 235, which connects these parts with each other.

The harrow is furthermore provided with a frame part 236, which comprises a substantially horizontal beam 237, the ends of which are provided with a strip 238 each (see FIG. 39). The strips 238 extend upwardly across the part 239 and initially approach each other, after which they are parallel to each other. Near the top ends the parts 238 are interconnected by means of a transverse piece 240. On the bottom side the strips 238 are provided with pins 241. The frame part is connected with the aid of the pins 241 with the lower arms 242 of the lifting device of a tractor 243, whereas the upper arm 244 of the lifting device is coupled with the frame part by means of a pin 245, which is taken through holes in the top ends of the parts 239. From the beam 237 onwards two beams 246 extend obliquely to the rear. These beams are bent over towards each other away from the beam 237 along a portion 247 and then extend parallel to each other. The parallel parts 248 of the beams 246 are connected with the strips 238 by means of two strips 249. The strips 249 are fastened to the upper sides of the parts 247 and extend away from the parts 247 towards the top ends of the strips 238. Between the parts 248 of the beams 246, near their lower ends, provision is made of a connecting strip 250 (see FIG. 36) and at their top ends of a plate 251. On the side of the beam 237 facing the harrow, near each end of this beam, provision is made of a support 252, which extends substantially in a horizontal direction and is provided at the ends with tags 253 each. The tags 253 are disposed opposite tags 254 on the beam 231. The distances between the tags 253 and the tags 254 are the same (see FIGS. 36 and 40). Between the pair of tags 253 and between the pair of tags 254 provision is made of a support 255 and 256, respectively. The supports 255 and 256 comprise each a rod 257 (see FIG. 36), the ends of which are provided with two tags, 258A and 258, each. The tags 258 and 258A are fastened to the rod by means of nuts 259, adapted to co-operate with screwthread at the ends of the rod 257 (see FIG. 41). The tags 258 and 258A are provided with holes at the ends remote from the rod 257, through which holes a pin 260 can be taken, which pin can be taken through holes in the tags 253 and 254 for fixing the support. A support is thus adapted to pivot about a substantially horizontal axis formed by the longitudinal center line of the pin 260. The supports 255 and 256 are provided on the facing sides with supports 261 and 262, respectively, formed by substantially vertical bearings. The bearings are displaceable along the rod 257 and are fixable with respect to the rod 257 by means of bolts 263.

FIG. 40 shows a structure in which the bearings can be displaced by means of a screw spindle 264, which is taken through holes in the tags 258A of a rod 257A. When the screw spindle is turned, the bearings move along the rod 257A away from each other or towards each other. In order to prevent the bearings from turning with respect to the rod, this rod 257A has an angular section. Between the supports 255 and 256 provision is made of bars 265, the curved ends of which are accomodated in the bearings. The bars are adapted to hinge about substantially vertical axes. From FIGS. 36 and 37 it will be seen that the bars extend for the major part above the portion 223 of the harrow unit.

FIGS. 42 and 43 show a structure in which the bars 265A arranged between the supports 255 and 256, respectively, have an angular section. The curved ends of the bars are arranged in holes of the supports 261 and 262 respectively, also having an angular section, with the space between the curved ends and the holes filled with resilient material 266, preferably rubber. The curved ends of the bars bear by means of shoulders 267 on the resilient material, while the parts projecting beyond the material are surrounded by rings 268, which are held in place by pins 269, taken through holes in the said parts.

With the aforesaid structures for coupling of the bars 265 and 265A with the supports 255 and 256, respectively a pivotal joint is obtained between the supports and the coupling elements formed by bars. The supports with the bars arranged in between them constitute a coupling piece, which, as a whole, can be readily detached after the removal of the pins 260. The coupling piece may be arranged with one support as well as with the other support between the same pair of tags. Between the upper sides of the strips 232 and the parts 248 of the beams 246 provision is made of a connecting member 270, which is fastened by means of hinge shafts 271 and 272, respectively. The connecting member comprises a plurality of blade springs 273, having a rectangular section and arranged between supports 274, which are pivoted by means of the pivotal shafts 271 and 272, respectively, to the strips 232 and the parts 248, respectively. The leaf springs 273 are arranged so that their flat sides extend substantially parallel to a vertical plane in the travelling direction of the harrow. The supports 274 are provided with a recess 275 each for accommodating the ends of the leaf springs. These ends are clamped tight in the recesses 275 by means of bolts 276. Approximately midway between the supports 274 a spacing piece 277 is arranged between the leaf springs 273, this spacer being held by means of a bolt 278. The spacer 277 is provided on the upper side with an extension 279 to which a ring 280 is attached so as to be pivotable about a shaft 281. To the ring 280 is attached a chain 282, which can be arranged in a recess 283 of the plate 251 located between the parts 248.

FIG. 44 is a plan view of part of the structure of the portion 222 of the harrow unit shown diagrammatically in FIG. 36. The harrow unit is provided with two beams 284, extending at a given distance from each other in the travelling direction of the harrow, these beams having in between them supporting beams 285, extending transversely to the travelling direction and having an angular profile. The supporting beams 285 are rotatably journalled by means of pins 286, secured at their ends, in holes provided in the beams 284. On one side of the beams 285 the pins 286 have secured to them arms 287, which are pivotably interconnected by means of a bar 288. The bar 288 extends substantially parallel to the beams 284 and is pivoted to a lever 289 at its front end, viewed in the travelling direction. This lever is pivoted to a beam 284 and is substantially parallel to the arms 287. The lever 289 is adjustable along a segment 290, arranged on a beam 284 and having holes 291. Through a hole in the lever 289, corresponding with the holes 291 of the segment 290 can be taken a pin 292. The tines 225, arranged on the supporting beams 285 are secured thereto by means of clamping pieces 293 and bolts 294.

The tines made from a single piece of steel rod comprises an active portion 295, which merges via a winding 296 in a portion 297, extending in the travelling direction of the harrow. The winding extends from the portion 295 in downward direction and its sense of winding is opposite the travelling direction of the harrow. The active portion extends from the curl downwardly in the travelling direction of the harrow.

The portion 297 is secured to a supporting beam 285 by means of a portion 298 extending substantially in the same direction as the arms 287 and the lever 289.

The tine portions are substantially orthogonal to each other and extend substantially rectilinearly. The portion 298 operates as a torsional rod, when the tine deviates resiliently.

The pivotal joints 226, arranged between the portions 222, 223 and 224 of a harrow unit, are secured to the beam 284, as will be seen from FIG. 46. The beam 228 is provided with an arcuated strip 299, extending transversely to the travelling direction of the harrow and having holes 300. At the level of the beam 228 the beam 294 of the portions 222 and 224, respectively, is provided with a strip 301, having a hole corresponding with the holes 300 of the arcuated strip 299. Through the hole in the strip 301 and through one of the holes 300 can be taken a pin 302, so that the portions 222 and 224 can be fixed in different positions relative to the portion 223.

The implement described operates as follows. During the travel of the harrow the tines of a unit, when dragged through the soil, are subjected to different resistances, a tine now being withheld, then being allowed to jump forwardly. In the implement shown in the figure the frame part 236 and the portion 223 have arranged between them two movable coupling elements formed by the bars 265, the center lines of which intersect each other at a point D, located on the longitudinal center line H of the unit. The unequal stress on the tines results in that the harrow unit performs a rocking motion around the point D. Thus the point D constitutes an instantaneous point of rotation. Owing to this reciprocating motion of a unit it is ensured that the soil of a strip of land over which the harrow is dragged is worked intensely by the tines and a satisfactory crumbling of the soil is obtained. Since the instantaneous point D of rotation is located at a place where few tines are provided in the tine distribution range of a unit, which means that the tines are spaced apart from the instantaneous point of rotation by a distance which exceeds half of the maximum distance between the tines of the unit, all tines of a field have, during the reciprocating motion around the point D, adequate freedom of movement to repel dirt and weeds.

From FIG. 36 it will be seen that the coupling points between the bars 265 and the supports 256, coupled with the frame of the harrow unit are located, viewed in the travelling direction of the harrow, behind the harrow unit, since this structure provides an adequate distance between the point D and the hindmost tines of a harrow unit.

As stated above, the supporting beams 285, to which the tines 225 are secured, can be turned by means of the lever 289 about their longitudinal axes, so that the position of the tines is variable; and they may, for example occupy the position shown in broken lines in FIG. 45. By means of the position variation of the tines the measure of motion of a harrow unit can be varied in operation. The connecting member 270, arranged between the bars 265, prevents the hindmost part of the harrow from being elevated during the travel. Owing to its resilience the connecting member does not hinder the reciprocating motion performed by the harrow during its travel. For transporting the harrow the pins 302 can be removed and the two outer portions of a field can be tilted up. In the tilted-up position the respective portions of a unit are locked by inserting the pin into a hole 300 of the arcuated strip 299 and into the hole in the strip 301.

From FIG. 37 it appears that the chain 282 is in a slack state under the operational conditions of the harrow. The length of this chain is adjustable by accommodating a different link in the recess of the plate 251. After the outer portions of a unit have been tilted up, the harrow can be elevated by means of the lifting device of the tractor. In the hoisted position the chain is taut.

In the embodiment shown in FIG. 47 the harrow is provided with three units 303, 304 and 305, shown diagrammatically and provided with tines and coupled with the frame part 236 in the same manner as is indicated in the embodiment according to FIG. 36. The units 303, 304 and 305 are rectangular and are arranged relatively to each other so that the units 303 and 305 located each on one side of the field 304 occupy a position farther to the rear with respect to this unit, viewed in the travelling direction of the harrow. Like the portions 222, 223 and 224 of a field of the preceding embodiment, the harrow units 303 and 305 can be tilted up in order to change over the harrow to the transport position, while the same locking member is used for locking the harrow in the operational state and in the transport state. The tines of the units 303, 304 and 305 (not shown) correspond with the tines described above with the embodiment according to FIG. 36. These tines may be arranged in a field so as to be adjustable in the manner described. The unit 304 is provided, near the ends, with beams 306, extending in the travelling direction. The units 303 and 305 are connected with the unit 304 by means of pivotal joints 307. The pivotal joints 307 correspond with the pivotal joints 226 of the first embodiment. They are provided with substantially horizontal pivotal shafts 308, extending substantially in the travelling direction of the harrow. The beams 306 are interconnected by means of a beam 309, extending transversely to the travelling direction. At equal distances from the center of the beam 309, provision is made of strips 310, similar to the strips 232 of the embodiment according to FIG. 36. The beam 309 is furthermore provided with tags 311, corresponding with the tags on the beam 231 of the embodiment according to FIG. 36. Since the coupling of the harrow units 303, 304 and 305 by means of the strips 310 and the tags 311 with the frame part of the harrow has been described above for the harrow in its embodiment, according to FIG. 36, it may be sufficient to refer thereto. The parts corresponding with the parts of the first embodiment are designated by the same reference numerals.

From FIG. 47 it will be seen that also with the second embodiment the instantaneous point D of rotation, forming the point of intersection of the center lines of the bars 265, is located behind the central field, the units being arranged around the point D so that, viewed in the travelling direction of the harrow, one unit is located in front of the point D and one unit is located on either side of the point D. Like in the preceding embodiment the distance between the tines and the point D exceeds half the maximum distance between the tines of a unit. Owing to the arrangement of the units shown in the figure, the point of application of the resultant of the resistances met by each tine of the units during its travel through the soil is located outside the units. With this embodiment the said point is located in the neighborhood of or is coincident with the instantaneous point of rotation D. It can thus be ensured that the said reciprocating motion of the units during the travel is performed more uniformly and that a satisfactory sowing unit can be obtained by means of this harrow.

FIG. 48 shows a harrow in which the pivotably interconnected parts 312, 313 and 314 of a unit shown diagrammatically have a curved shape, so that the convex side of the unit curvature is located on the front side of the harrow. Since the further parts of the harrow of this figure correspond with the parts of the harrow in the first embodiment, they are designated in the figure by corresponding reference numerals.

From FIG. 49 it will be seen that the part 312, 313 and 314 consists of a number of arcuated supported beams 315, the ends of which are interconnected by beams 316. On the supporting beams are provided, at equal distances, tines 317, which comprise each a portion 318, fastened to a supporting beam 315. To the lower side of the part 318 is secured by means of a bolt 319 a blade 320 (see FIG. 50). This blade is elongated in shape and extends with its longitudinal center line in downward direction. Both on the bottom side and on the upper side of the blade-shaped member 320 tapers towards the end (see FIGS. 51 and 52), whereas the angle at one end exceeds the angle at the other end, so that the blade-shaped member has a different shape at both its ends. After the bolt 319 has been detached, the blade can be turned through 180°, so that the other end points downwards and the plane of application of the blade to the soil is changed. This change-over may be advantageous in working different kinds of soil.

This harrow, comprising arcuated units operates similarly to the harrow of the preceding embodiment. Also in this case the point of application of the aforesaid resultant and the instantaneous point of rotation D, which has the same position with respect to the tines as in the preceding embodiments, substantially coincide, while the foremost part of the unit, viewed in the travelling direction of the harrow, is located in front of the point D and the parts 302 and 304 are located each on one side of the said point.

FIG. 53 shows the same harrow as FIG. 49, however, the coupling member is replaced by a chain 321, which is coupled with a beam 321A of the tractor. During the travel the harrow unit performs a reciprocating motion due to this coupling method around an instantaneous point of rotation, which substantially coincides with the point of application of the said resultant and is located at a distance from the tines which exceeds half the maximum distance between the tines.

In the harrow shown in FIG. 54 also three parts 322, 323 and 324 of a harrow unit, interconnected in the manner described above, are shown diagrammatically. The unit is coupled with a tractor by means of the coupling described above, shown in FIG. 36. The parts 322 and 324 extend obliquely in the travelling direction of the harrow. The tines (not shown in FIG. 54), in the harrow unit are similar to the tines 317 of the preceding embodiment. The tines are fastened to beams 325, forming part of a frame 326 (see FIGS. 55 and 56). With the harrow in this embodiment the instantaneous point of rotation D, which has the same position with respect to the tines as in the preceding embodiment, is located behind the point of application of the resultant of the resistances met by the tines of a field during their travel through the soil, viewed in the travelling direction of the harrow. The reciprocating motion of the harrow unit during its travel is thus more vigorous than with the harrows of the preceding embodiments.

FIG. 57 shows a harrow which is coupled with a tractor in the manner described above. This coupling is shown diagrammatically. The harrow comprises an elliptical field 327, which comprises a number of supporting beams 328, which are interconnected by means of a beam 329, extending transversely to the travelling direction of the harrow. A supporting beam 328 has secured to it in the manner shown in FIG. 58 the tines 225, described with reference to the embodiment according to FIG. 36. As in the preceding embodiments the parts corresponding to those of the embodiment according to FIG. 36, are designated by the same reference numerals.

The harrow shown in FIG. 59 comprises an elliptical unit 330, while the supporting beams 331, to which the tines 225 of the embodiment according to FIG 36 are secured in the manner described with reference to FIG. 60 extend each on one side of the ellipse over a given distance parallel to each other, transversely to the travelling direction of the harrow. Thus the harrow unit has a larger working width.

The operation of the harrows comprising elliptical units is similar to the operation of the harrows in the second and the third embodiments, while the instantaneous point of rotation D and the substantially coinciding point of application of the resultant of the resistances encountered by the tines in the operation of the harrow are located approximately at the center of the elliptical field. Also in this case a unit portion is located behind the foremost unit portion, viewed in the travelling direction.

The harrow shown in FIG. 61 is also coupled with a tractor in the manner described above; this coupling being shown diagrammatically. This harrow comprises two units 332 and 333, lying one behind the other and shown diagrammatically. The unit 333 is coupled with the unit 332 by means of a frame 334, corresponding with the frame formed by the beams 228, 229 and 230 of the embodiment according to FIG. 36. The harrow unit 332 is coupled with the tractor with a similar frame 335. The operation of this harrow is similar to the operation of the harrows in the preceding embodiment according to FIG. 36, while the point of application of the resultant of the resistances exerted on the tines during the travel substantially coincides with the instantaneous point of rotation D which, as will be seen from the Figure, is located between the units 332 and 333.

FIG. 62 shows a harrow in which the units 336 and 337, shown diagrammatically, are located side by side and are interconnected by means of a frame 337A, which is similar to the frame formed by the beams 228, 229 and 230 of the embodiment according to FIG. 36. The frame 337A is coupled with a tractor by means of a chain 337B. The coupling point of the chain 337B with the frame 337A is located on the longitudinal center line of the fields 336 and 337. The distance between the units 336 and 337 amounts to at least half of the length of a unit. Although it is not illustrated, it will be obvious that the coupling member shown in FIG. 36 may be replaced by a coupling member of the kind shown in FIGS. 54 and 61.

With the harrow units of this embodiment and of the preceding embodiment provision may be made of tines corresponding with the tines 225 of the embodiment according to FIG. 36 and being adjustable in the same manner by turning the supports. During the travel of the harrow in this embodiment the units 336 and 337 will perform a reciprocating motion about an instantaneous point of rotation which substantially coincides with the point of application of the resultant of the resistances met by the tines during the travel, so that the distances of the tines from his point of rotation exceed half the maximum distance between the tines of a unit. Also in this embodiment the point of application of the said resultant is located between the units 336 and 337.

The device shown in FIGS. 63 and 64 is formed by a harrow, the unit 358 of which is shown diagrammatically. The field 358, provided with tines 358A, is provided behind the center with a vertical pin 359, arranged on the upper side thereof. This pin 359 is surrounded by a ring 360, to which a coupling member formed by a coupling arm 361 is fastened, which is hinged to a frame part 362. In order to fix the ring 360 the pin 359 is provided at its upper end with a safety pin 359A.

The frame part 362 is coupled with the lower arms 363 of the lifting device of a tractor 364. Near its fastening point to the ring 360 the coupling arm 361 is provided on its upper side with a plate 365, in which holes 366 are provided for accommodating a bolt 367 in order to obtain a pivotal fastening of the connecting bar 368. The bolt 367 is also taken through holes in the limbs of a fork-shaped part 369, which is provided at one end of the bar 368. At its other end the bar 368 is provided with a fork-shaped part 370, which is hinged to the top arm 371 of the lifting device of the tractor 364. Near its hinge connection with the frame part 362, the coupling arm 361 is provided with an upright strip 372, which is curved at the top to form a part 373. Through a hole in the latter part a bar 374 is adapted to slide. This bar is pivoted by means of a fork-shaped part 375 to a shaft 376 and coupled with a tag 377, provided on the connecting bar 368. On either side of the part 373, the bar 374 is surrounded by a spring 378. The spring 378 is enclosed between the part 373 and the fork 375 of the bar 374 and between the part 373 and a stop 379 provided on the bar. The stop 379 can be displaced along the bar 374 by means of nuts 379A, co-operating with screw thread provided on the bar 374. Between the front side of the harrow field 358 and the frame part 362, connected with the lower arms 363 of the lifting device of the tractor, a helical spring 380 is arranged one on each side of the coupling arm. These helical springs extend substantially in the travelling direction P of the implement. For fastening the spring 380 the harrow unit is provided with tags 381, which are provided with holes for accommodating the ends of the springs. At the end remote from the harrow unit each spring 380 is provided with a bar 382. This bar is taken through holes in the tags 383, provided on the frame part 362. These tags are furthermore provided with a nut 384, adapted to co-operate with screw thread on the bar 382. At each side of the springs 380 between the frame part 362 and the harrow unit a chain 385 is provided on each side remote from one another. Supports 386 provided on the frame part 362 are provided each with a recess 387, which is shaped in a form such that a chain link arranged therein is rigidly held, so that the length of the chain can be varied (see FIG. 65). Between two tags 388 provided on the top side of the coupling arm 361 a support 390 is provided so as to be pivotable about a shaft 389. This support is provided at its free end with a fork 391. The arm is provided with a strip 392 at such a distance from the tags 388 that it can be accommodated between the prongs of the fork 391.

The prongs of the fork, similarly to the trip, are provided with a hole through which a pin 393 can be taken. Before the harrow can be lifted the pin 393 is removed and the support 392 is tilted up, so that the prongs of the fork 391 are arranged each on one side of the connecting bar 368 (see FIG. 64, position indicated in broken lines).

Then the pin 393 can be inserted again in the holes in the prongs of the fork 391, after which the implement can be lifted by the lifting device of the tractor.

The device described above operates as follows.

During the travel of the harrow in the direction of the arrow P the tines of the harrow unit, when dragged through the soil, encounter a constantly varying resistance. This results with the coupling member arranged between the frame part 362 and the harrow unit 358 in that the harrow unit is held in substantially the same plane and performs a reciprocating motion during the travel of the device. The harrow unit moves around a substantially vertical rotary axis at the coupling point of the coupling arm 361 and the harrow unit 358, which coupling point is located, as stated above, near the center of the unit.

The aforesaid reciprocating motion results from a force exerted on the harrow unit and having mainly three components. These components all result from the varying resistance encountered by the tines when dragged through the soil. The said components are formed by a force, imparting a motion in the direction of the arrow K to the harrow unit (see FIG. 63) and a force, imparting a motion in the direction of the arrow E (see FIG. 64), whereas the sides of the harrow unit on either side of the said coupling point are subjected to a force producing a motion in a direction of height and causing the harrow unit to perform during the reciprocating motion a so-called step motion. In order to limit the reciprocating motion of the harrow unit, the helical springs 380 are provided, which increase the violence of the reciprocating motion within the limits. By varying the tension of the springs 380 with the aid of the nut 384, the violence of the motion can be acted upon. By means of the chains 385 the reciprocating motion can be restricted within the limits set by the springs 380 and by adequate shortening of the chains, this motion can be practically obviated. The motion of the harrow unit results in that during the travel of the harrow the tines do not follow a straight line across the soil, so that the whole strip of land across which the harrow is dragged will be worked and a satisfactory crumbling of the soil is ensured. This crumbling increases according as the motion of the harrow unit is more vigorous. As stated above, the motion can be substantially completely avoided by shortening the chains 385, which may be desirable in finishing a sowing field, which must be as flat as possible.

Apart from the intensive working of the soil, the motion of the harrow unit provides a thorough cleaning of the tines, so that the risk of clogging of the harrow unit is considerably reduced. Since the coupling arm 361 is connected with the frame part 362 so as to be pivotable about a substantially horizontal axis, which frame part is coupled with the lower leverage 363 of the lifting device of the tractor, the harrow unit can match the unevennesses of the soil. This pivotal motion of the coupling arm 361 is counteracted by the springs 378 provided on the bar 374, which springs tend to hold the connecting bar in the central position. It is thus ensured that the working depth of the tines of the harrow is substantially constant, while at the same time the harrow can escape resiliently the obstacles in the soil. The tension of the springs 378 may be increased by tightening the stop 379. This increased spring tension may be desirable particularly in the case of heavy, hard soil. Moreover, a displacement of the coupling point between the connecting bar 368 and the coupling arm by inserting the bolt 367 into a different hole of the plate 365, may affect the pressure exerted on the harrow unit since thus the coupling point is shifted more or less to the center of the harrow field.

In the embodiment shown in FIGS. 66 and 67 a number of units 394, provided with tines 394A, which units are shown diagrammatically, are arranged by means of a coupling arm 395 on a frame part 396, extending substantially horizontally transversely to the travelling direction of the harrow. The coupling arm 395 is fastened to a sleeve 397, which is in contact with a pin 339 by means of elastic material on the harrow unit 394. The pin 399 is located behind the center of the harrow field. The elastic material 398, preferably rubber, is arranged between the sleeve 397 and the pin 399 and is fastened both to the sleeve and to the pin.

From FIG. 67 is will be seen that the coupling arm 395 extends from the sleeve 397 along an arc above the harrow unit. The coupling arm 395 is hinged to the frame part 396 by means of a bearing 400. Near the bearing 400 the frame part 396 is provided with brackets 401, the limbs 402 of which extend each on one side of the coupling arm 395. On the side facing the coupling arm 395 the limbs of these brackets are provided with stops 403, which are adapted to co-operate with stops 404, provided on the coupling arm. The relatively co-operating stops 403 and 404 are surrounded by springs 405, which tend to hold the coupling arm in the central position (see FIGS. 67 and 69). At a given distance from each other caster ground wheels 406 are provided on the frame part 396. At equal distances from the center the frame part 396 is provided with upright, relatively approaching strips 407, which are connected with each other at the top.

Between the lower arms 408 and the top arm 409 of a lifting device of a tractor 410 provision is made of a support 411, which is formed by a triangular frame. The basis thereof is formed by a beam (not shown) arranged between the lower arms 408, whereas the oblique sides of the triangle are formed by strips 412, which are coupled with each other at the top and are provided with holes for the connection with the top arm 409 of the said lifting device.

To the lower side of the support 411 are provided two rods 413, which extend substantially in the travelling direction of the harrow. At the other end these rods are pivoted to the strips 407. Between the top side of the support 411 and the top ends of the strips 407 is pivotally attached a rod 414. The rods 413 and 414 constitute a pivotable rod system, which links the support 411 associated with the harrow to the frame part 396 and allows the harrow supported from ground wheels 406 to move in a direction of height in operation. The support 411 is provided on the upper side with an arm 415, which is connected by means of a chain 416 with the rod 414. In the operation of the harrow this chain is slack (see FIG. 67). Only during the elevation of the harrow this chain is stretched. During the travel of the harrow in the direction P a harrow unit performs the aforesaid reciprocating motion about a substantially vertical axis of rotation at the coupling point between the coupling arm 395 and the harrow unit, which point is located behind the center of the harrow unit. The reciprocating motion is inhibited in this case by the elastic material 398, arranged between the pin 399 and the sleeve 397 which material is deformed during the motion and increases the vigor of the reciprocating motion owing to its elasticity.

Within the aforesaid limits the motion can be further restricted by a chain 417 (see FIG. 67) between the coupling arm 395 and the front side of the harrow unit. The restriction provided by the chain 417 prevents the harrow units from becoming entangled during the operation due to the reciprocating motion.

By stretching the chain the harrow of this embodiment can operate, as an alternative, without an appreciable reciprocating motion. In order to utilize the whole working width of the harrow also in this case the harrow units overlap each other in the travelling direction (see FIG. 66). Apart from the said movability of the harrow in the direction of height owing to the use of the pivotal rod system 413, 414, each harrow unit can match the unevennesses of the soil independently of the other units, since the coupling arm 395 is pivotable about the frame part 396. The springs 405 surrounding the stops 403 and 404 tend to hold the coupling arm in the central position.

As stated above, the chain 416 is stretched during the elevation of the harrow. The stop 404, provided on the lower side of the coupling arm 395 comes into contact with the stop 403, provided on the lower limb of the bracket 400, so that the downward movement of the coupling arm is limited.

In the embodiment shown in FIGS. 70 and 71 the harrow units 418 (shown diagrammatically), provided with tines 418A are connected by means of a coupling arm 419 with a substantially horizontal frame part 420, extending transversely to the travelling direction of the harrow. The coupling arm 419, as in the first embodiment, is pivoted to the harrow unit with the aid of a ring 421, which surrounds a pin 422, located behind the center of the harrow unit and locked by a safety pin 422A. The coupling arm 419 extends in the form of an arc from the harrow unit above the latter and is rigidly secured to the frame part 420 (see FIG. 71). Each unit is furthermore connected with the frame part by means of two resilient elements formed by helical springs 423. To this end the front side of the harrow unit is provided with tags 424, provided each with a hole into which is inserted one end of a helical spring 423. The frame part 420 is provided with tags 425, through which a bar 426 is taken, which is connected with a helical spring 423. This bar is provided with screw thread, adapted to co-operate with a nut 427, connected with the tag 425. From FIG. 70 it will be seen that the distance between the tags 425 on the frame part 420 exceeds the distance between the tags 424 on a unit 418. Thus the center lines $h$ of the springs intersect each other at a point located behind the front side of a unit. In the figure this point substantially coincides with the coupling point between the coupling arm 419 and a harrow unit. As in the embodiment according to FIG. 63, a chain 428 may be provided each on one side of the spring 423. The frame part 420 is furthermore provided with two caster ground wheels 429, arranged at equal distances from the center. On either side of the center, at equal distances therefrom, the frame part 420 is provided with tags 430, while at the highest point of a coupling arm 419 located just at the center of the frame part 420 provision is made of a tag 431. Between the tags 430 and 431 and a supporting structure 432 provision is made of substantially parallel, pivotable rods 433 and 434. The supporting structure 432 comprises a support 435, which is coupled with a tractor 436 and which is similar to the support 411, described with reference to the former embodiment. The support 435 is provided with supporting members 437, which are provided with relatively approaching, upwardly and rearwardly directed strips 438. On the upper sides the strips 438 are connected with each other and fastened to the upper side of the support 435 by means of a support 439. The rods 433 and 434 are pivoted to the strips 438. The support 435 is coupled with the lower arms 440 and the top arm 441 of the lift of the tractor 437. Between the rod 434 and the support 439 provision is made of a bar 442, which is pivoted to the rod 434 and is slidable through a hole in the support 439. On either side of the support 439 the bar 442 is provided with stops 443 and 444. The bar 442 is surrounded, between these stops and the support 439, by springs 445. The stop 444 is in contact with nuts 444A, which are adapted to co-operate with screwthread on the bar 442, so that by turning them they can displace the stop 444 along the bar. Between the support 439 and the rod 434 provision is made of a chain 446, which is in a slack state in operation (see FIG. 71), but which is stretched when the harrow is elevated. As in the preceding embodiments a harrow unit performs the said reciprocal motion during the travel of the harrow around a substantially vertical axis of rotation at the coupling point between the coupling arm 419 and the harrow unit. In the structure of this embodiment the reciprocating motion is limited by the springs 423, which as in the embodiment according to FIG. 63, increase the vigor of the motion within the limits. From FIG. 70 it may be seen and as it is stated above, that the center lines $h$ of the springs 423 intersect each other at a point which is located on a line going approximately through the center of a harrow unit viewed in the travelling direction. This provides a more vigorous rocking motion of the harrow unit. In order to prevent also in this case the harrow units from becoming entangled by their tines during the reciprocating motion, a chain 428 is provided, as in the first embodiment, each on one side of the springs 424. As in the embodiment according to FIG. 63, the length of the chain 428 is adjustable, so that, if desired, for example for finishing a flat sowing field, the oscillation can be practically obviated. The frame part 420, together with the harrow units, is adapted to move in a direction of height by means of the pivotable rod system 433, 434. The frame part 420 is held in the central position by the springs 445, which are provided on the bar 442. A variation of the spring tension is possible by turning the nuts 444A.

What we claim is:
1. In an soil tilling implement having a tilling portion and a connecting assembly for attaching same to a prime mover, said assembly comprising a hitch portion and a link structure, said link structure having at least two coupling members, said members converging towards and connected to said tilling portion, said hitch portion including supporting means extending to said coupling members, said supporting means being movably connected to said coupling members about substantially vertical pivotal axes to link said hitch portion with said link structure, said coupling members being movably connected to said tilling portion of the implement about substantially vertical pivotal axes, a connecting member located above and extending substantially parallel to said coupling members, said connecting member extending in the direction of travel and pivotally connecting said hitch portion with said tilling portion.

2. The implement of claim 1, wherein the coupling members are resilient.

3. The implement of claim 1, wherein the prolongation of said connecting member intersects the plane going through the coupling members at a point located behind the connecting points of the coupling members and the tilling portion.

4. The invention of claim 1 wherein a first beam pivotally joins the rearmost ends of the coupling members and the connecting member to the tilling portion and a second beam pivotally joins the foremost ends of the coupling members and the connecting member to the hitch portion whereby said connecting assembly comprises a pivoted quadralateral structure and the tilling position independently from the hitch portion is allowed to make reciprocating movements in a substantially transverse direction during operation.

5. The implement of claim 4 wherein the first beam is articulated to the tilling portion and said tilling portion includes two pivoted elements which extend substantially parallel, said elements being pivotally connected to the first beam.

6. The implement of said claim 4 wherein the two lower converging coupling members constitute a coupling piece.

References Cited by the Examiner
UNITED STATES PATENTS

| | | | |
|---|---|---|---|
| 276,071 | 4/1883 | Pollock | 172—623 |
| 288,472 | 11/1883 | Nash et al. | 172—627 |
| 455,260 | 6/1891 | La Dow | 172—627 |
| 600,659 | 3/1898 | Whipple | 172—627 X |
| 603,446 | 5/1898 | Hoke | 172—639 |
| 633,270 | 9/1899 | Oppen | 172—639 |
| 1,019,210 | 3/1912 | Wilson | 172—677 |
| 1,188,119 | 6/1916 | Tyrrell | 280—486 |
| 1,202,569 | 10/1916 | Nielson et al. | 172—689 |
| 1,336,421 | 4/1920 | Burke | 172—689 |
| 1,627,002 | 5/1927 | Zuehlke | 172—624 |
| 1,682,322 | 8/1928 | Cambell | 172—627 |
| 1,766,396 | 6/1930 | Miller | 172—707 |
| 1,820,541 | 8/1931 | Paul | 172—627 |
| 2,090,739 | 8/1937 | Wyss | 172—707 |
| 2,157,702 | 5/1939 | Hoke | 172—624 |
| 2,551,456 | 5/1951 | Oerman | 280—486 X |

(Other references on following page)

UNITED STATES PATENTS

| | | | |
|---|---|---|---|
| 2,590,011 | 3/1952 | Hawkins | 172—443 |
| 2,689,750 | 9/1954 | Van Horn | 280—486 X |
| 2,755,722 | 7/1956 | Fraga | 172—239 |
| 2,765,723 | 10/1956 | Clarke, et al. | 172—449 X |
| 2,785,614 | 3/1957 | Jensen | 172—443 |
| 2,817,203 | 12/1957 | Sievers et al. | 172—677 |

FOREIGN PATENTS

| | | |
|---|---|---|
| 1,203,191 | 7/1959 | France. |
| 737,135 | 9/1955 | Great Britain. |

ABRAHAM G. STONE, *Primary Examiner.*

EUGENE G. BOTZ, RUSSELL R. KINSEY, T. GRAHAM CRAVER, *Examiners.*